United States Patent
Lee et al.

(10) Patent No.: US 6,873,499 B2
(45) Date of Patent: Mar. 29, 2005

(54) READ HEAD HAVING HIGH RESISTANCE SOFT MAGNETIC FLUX GUIDE LAYER FOR ENHANCING READ SENSOR EFFICIENCY

(75) Inventors: Wen Yaung Lee, San Jose, CA (US); Tsann Lin, Saratoga, CA (US); Daniele Mauri, San Jose, CA (US); David John Seagle, Santa Barbara, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 09/769,165

(22) Filed: Jan. 24, 2001

(65) Prior Publication Data

US 2001/0004306 A1 Jun. 21, 2001

Related U.S. Application Data

(62) Division of application No. 09/206,016, filed on Dec. 4, 1998, now Pat. No. 6,223,420.

(51) Int. Cl.[7] ................................................ G11B 5/39
(52) U.S. Cl. ........................................................ 360/321
(58) Field of Search ................................ 360/317, 321, 360/322

(56) References Cited

U.S. PATENT DOCUMENTS

| | | | |
|---|---|---|---|
| 4,489,357 A | 12/1984 | Van Ooijen et al. | 360/113 |
| 5,018,037 A | * 5/1991 | Krounbi et al. | 360/327.31 |
| 5,241,439 A | * 8/1993 | Michalek et al. | 360/321 |
| 5,390,061 A | 2/1995 | Nakatani et al. | 360/113 |
| 5,469,317 A | * 11/1995 | Nagata et al. | 360/321 |
| 5,473,492 A | 12/1995 | Terunuma et al. | 360/128 |
| 5,508,868 A | 4/1996 | Cheng et al. | 360/113 |

(Continued)

FOREIGN PATENT DOCUMENTS

| | | |
|---|---|---|
| EP | 0 654 782 A2 | 11/1994 |
| JP | 404144210 A | 5/1992 |
| JP | 408087715 A | 9/1994 |
| JP | 408277445 A | 4/1995 |
| JP | 8-339514 | 6/1995 |
| JP | 408138212 A | 5/1996 |
| JP | 408161711 A | 6/1996 |
| JP | 408287425 A | 11/1996 |
| JP | 408339508 A | 12/1996 |
| JP | 408339514 A | 12/1996 |
| JP | 409212820 A | 8/1997 |

OTHER PUBLICATIONS

"Microstructure and Magnetoresistance of Fe–Hf–O Films with High Electrical Resistivity", Journal of Magnetism and Magnetic Materials, 154, 1996, 175–182.

"Fe–Hf–N Soft Magnetic Film for Magnetoresistive Head Biasing", *IBM Technical Disclosure Bulletin*, vol. 39, No. 10, Oct. 1996, pp. 19–20.

*Primary Examiner*—Brian E. Miller
(74) *Attorney, Agent, or Firm*—Ervin F. Johnston

(57) ABSTRACT

A read head has a flux guide layer that is immediately adjacent (abuts) the back edge of a read sensor. The flux guide layer is made of a high resistance soft magnetic material that conducts magnetic flux from the back edge of the read sensor so that the magnetic response at the back edge of the read sensor is significantly higher than zero. This increases the efficiency of the read sensor. The material for the flux guide layer is A-B-C where A is selected from the group Fe and Co, B is selected from the group Hf, Y, Ta and Zr and C is selected from the group O and N. In a preferred embodiment A-B-C is Fe—Hf—O and the $M_s\rho$ of the flux guide layer is greater than 50 times the $M_s\rho$ of the read sensor layer where the read sensor layer is NiFe, $M_s$ is saturation magnetization and $\rho$ is resistivity. Because of the flux guides high resistance current shunting losses are nearly eliminated.

19 Claims, 14 Drawing Sheets

U.S. PATENT DOCUMENTS

| | | | |
|---|---|---|---|
| 5,523,687 A | 6/1996 | Mouchot et al. | 324/252 |
| 5,527,626 A | 6/1996 | Gijs et al. | 428/611 |
| 5,541,793 A | 7/1996 | Schwarz | 360/121 |
| 5,583,726 A * | 12/1996 | Mizoshita et al. | 360/321 |
| 5,617,275 A | 4/1997 | Ogura et al. | 360/113 |
| 5,627,704 A | 5/1997 | Lederman et al. | 360/113 |
| 5,636,093 A | 6/1997 | Gijs et al. | 360/126 |
| 5,702,832 A | 12/1997 | Iwasaki et al. | 428/611 |
| 5,731,937 A | 3/1998 | Yuan | 360/113 |
| 5,894,385 A * | 4/1999 | Gill et al. | 360/321 |
| 5,905,610 A * | 5/1999 | Mitchell et al. | 360/317 |
| 5,909,344 A * | 6/1999 | Gill | 360/321 |
| 5,930,084 A * | 7/1999 | Dovek et al. | 360/321 |
| 5,995,339 A * | 11/1999 | Koshikawa et al. | 360/321 |
| 6,028,749 A * | 2/2000 | Postma | 360/327.31 |
| 6,101,072 A * | 8/2000 | Hayashi | 360/324 |
| 6,103,545 A * | 8/2000 | Fedeli | 438/53 |
| 6,137,661 A * | 10/2000 | Shi et al. | 360/321 |
| 6,205,007 B1 * | 3/2001 | Ruigrok et al. | 360/313 |
| 6,223,420 B1 * | 5/2001 | Lee et al. | 29/603.14 |
| 6,233,126 B1 * | 5/2001 | Van der Zaag et al. | 360/321 |
| 6,266,217 B1 * | 7/2001 | Ruigrok et al. | 360/320 |
| 6,369,992 B1 * | 4/2002 | Yoda et al. | 360/321 |
| 6,396,670 B1 * | 5/2002 | Murdock | 360/319 |

\* cited by examiner

READ HEAD HAVING HIGH RESISTANCE SOFT MAGNETIC FLUX GUIDE LAYER FOR ENHANCING READ SENSOR EFFICIENCY

REFERENCE TO RELATED APPLICATION

This is a divisional application of Ser. No. 09/206,016 filed Dec. 4, 1998 now U.S. Pat. No. 6,223,420.

BACKGROUND OF THE INVENTION

1. Field of the Invention

The present invention relates to a read head with a high resistance soft magnetic flux guide layer for enhancing read sensor efficiency and, more particularly, to one or more high resistance soft magnetic flux guide layers that abut one or more end edges of the read sensor layer for increasing the magnetoresistive signal and/or for protecting the read sensor layer from direct exposure to the environment.

2. Description of Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A magnetic gap is formed between the first and second pole piece layers by a write gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing information in tracks on moving media, such as in circular tracks on a rotating disk.

The read head includes first and second shield layers, first and second gap layers, a read sensor and first and second lead layers that are connected to the read sensor for conducting a sense current through the read sensor. The first and second gap layers are located between the first and second shield layers and the read sensor and the first and second lead layers are located between the first and second gap layers. The distance between the first and second shield layers determines the linear read density of the read head. The read sensor has first and second side edges that define a track width of the read head. The product of the linear density and the track density equals the areal density of the read head which is the bit reading capability of the read head per square inch of the magnetic media.

The first and second leads abut the first and second edges of the read sensor in a connection which is referred to in the art as a contiguous junction. Each of the leads and the read sensor comprises a plurality of films. The read sensor can be a spin valve read sensor or an anisotropic magnetoresistive (AMR) read sensor. A spin valve read sensor typically includes a spacer film sandwiched between a free film and a pinned film. Adjacent the pinned film is a pinning film for pinning a magnetic moment of the pinned layer. The free layer has a magnetic moment that is free to rotate relative to the fixed magnetic moment of the pinned layer in response to field incursions from the rotating magnetic disk. This causes a change in resistance of the read sensor to the sense current that can be detected as potential changes by processing circuitry. Each lead typically includes a conductor film and one or more biasing films that bias the free film of the read sensor.

The free film is a soft magnetic material, such as Permalloy (NiFe). Magnetic incursions from the rotating magnetic disk rotate the magnetic moment of the free film. Unfortunately, magnetic spins in end portions of the free film are unstable. These magnetic spins are in domains that interface with each other along domain walls. When the free film is subjected to and then released from a magnetic field the domain walls do not return to their same orientation. This changes the magnetics of the free film and affects its performance. Accordingly, the end portions of the free film must be biased so that the magnetic spins in the end portions are directed parallel to the ABS in a single domain state. This biasing is accomplished by one of the aforementioned biasing films in each of the lead layers that abuts the first and second side edges of the read sensor and longitudinally biases the free layer parallel to the ABS.

The quality of the read sensor is rated by its change in resistance with respect to its resistance. The higher the ratio the better the read sensor. Unfortunately, upon the occurrence of a flux incursion from a rotating magnetic disk the field in the read sensor decays from a maximum at the ABS to zero at its back edge (stripe height). This decay reduces the ratio of the read sensor so that it is less efficient. In order to reduce this decay a flux guide layer has been located adjacent the back edge of the read sensor. A small amount of insulation is located between the edges of the read sensor and the flux guide layer so that the flux guide layer will not shunt the sense current. Unfortunately, this small amount of insulation seriously impacts a necessary magnetic path between the read sensor and the flux guide layer. For this reason flux guides have not been effective and therefore they have not been employed.

SUMMARY OF THE INVENTION

The present invention provides a flux guide layer that is immediately adjacent (abuts) the back edge of the read sensor. The flux guide layer is made of a high resistance soft magnetic material so that it will not shunt the sense current and will be highly responsive to magnetic stray fields from the back edge of the read sensor so that the magnetic rotation at the back edge of the read sensor is significantly higher than zero. This in turn increases the dr of the read sensor and makes it more efficient. The material for the flux guide layer is A-B-C where A is selected from the group Fe and Co, E is selected from the group Hf, Y, Ta and Zr and C is selected from the group O and N. In a preferred embodiment A-B-C is Fe—Hf—O. In the preferred embodiment the $M_s\rho$ of the flux guide layer is greater than 50 times the $M_s\rho$ of the read sensor layer where the read sensor layer is NiFe, the $M_s$ is saturation magnetization and $\rho$ is resistivity. The percent of the sense current shunted in the preferred embodiment is only 0.7%.

In another embodiment a second flux guide layer is immediately adjacent a front edge of the read sensor and has an edge at the ABS. The second flux guide layer shelters the read sensor from corrosion at the ABS. In still another embodiment only one flux guide layer is located immediately adjacent the front edge of the read sensor. In all embodiments the biasing layer in each of the first and second lead layers biases end portions of the one or more flux guide layers so that they are magnetically stabilized in the same manner as the read sensor layer.

We have also provided several methods of making the one or more flux guide layers. In one method the width of the one or more flux guide layers is greater than the width (track width) of the read sensor. In another method the width of the one or more flux guide layers and the read sensor layer are the same. This latter method gives better control over the dimensions of the one or more flux guides in order to optimize resistivity and saturation magnetization of the one or more flux guide layers.

An object of the present invention is to provide one or more high resistance soft magnetic flux guide layers for a read sensor.

Another object is to provide one or more flux guide layers that have end edges immediately adjacent one or more end edges of a spin valve read sensor where $M_s\rho$ of each of the one or more flux guide layers is at least 10 times the $M_s\rho$ of the free layer of the spin valve sensor.

A further object is to provide one or more flux guide layers that have end edges immediately adjacent one or more end edges of a spin valve read sensor where the $M_s\rho$ of each of the one or more flux guide layers is at least 50 times the $M_s\rho$ of the free layer of the spin valve sensor.

Still another object is to accomplish the immediately preceding object as well as each of the one or more flux guide layers shunting only a small percentage of the sense current.

Still a further object is to provide a method of making the one or more flux guide layers wherein the one or more flux guide layer has a greater width than the read sensor or the same width as the read sensor.

Other objects and advantages of the invention will become apparent upon reading the following description taken together with the accompanying drawings.

DESCRIPTION OF THE PREFERRED EMBODIMENTS

Magnetic Disk Drive

Figure 1:
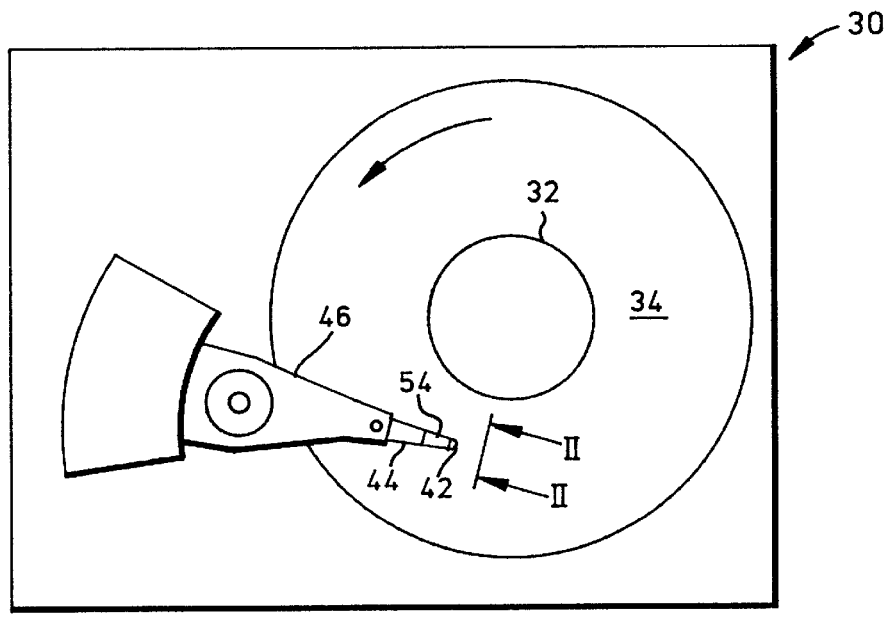
FIG. 1 is a planar view of an exemplary magnetic disk drive.
Figure 2:
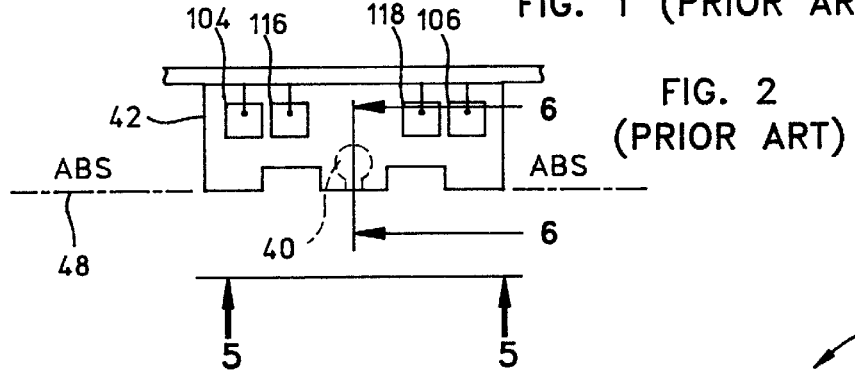
FIG. 2 is an end view of a slider with a magnetic head of the disk drive as seen in plane 2—2.
Figure 3:
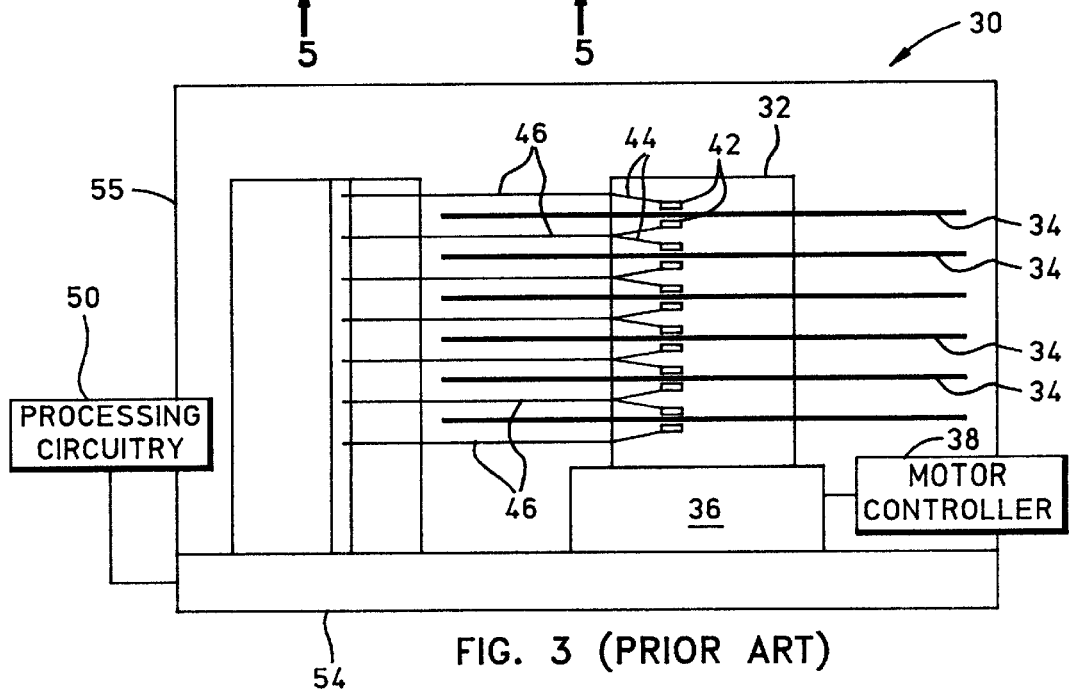
FIG. 3 is an elevation view of the magnetic disk drive wherein multiple disks and magnetic heads are employed.
Figure 4:
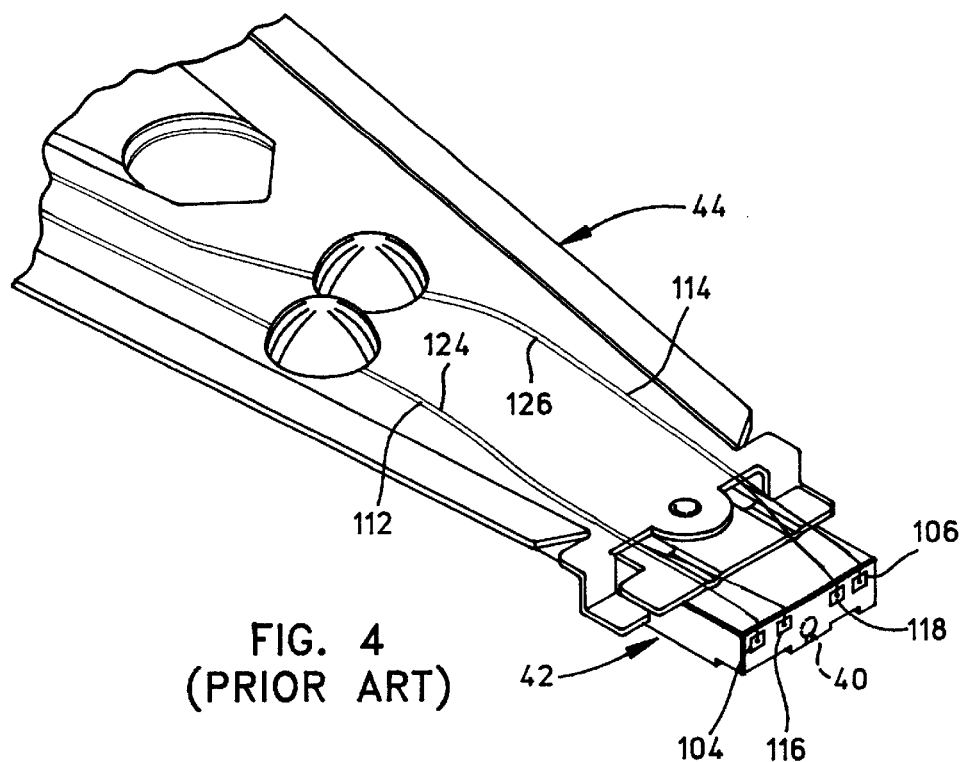
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54 of a housing 55, as shown in FIG. 3.

Figure 5:
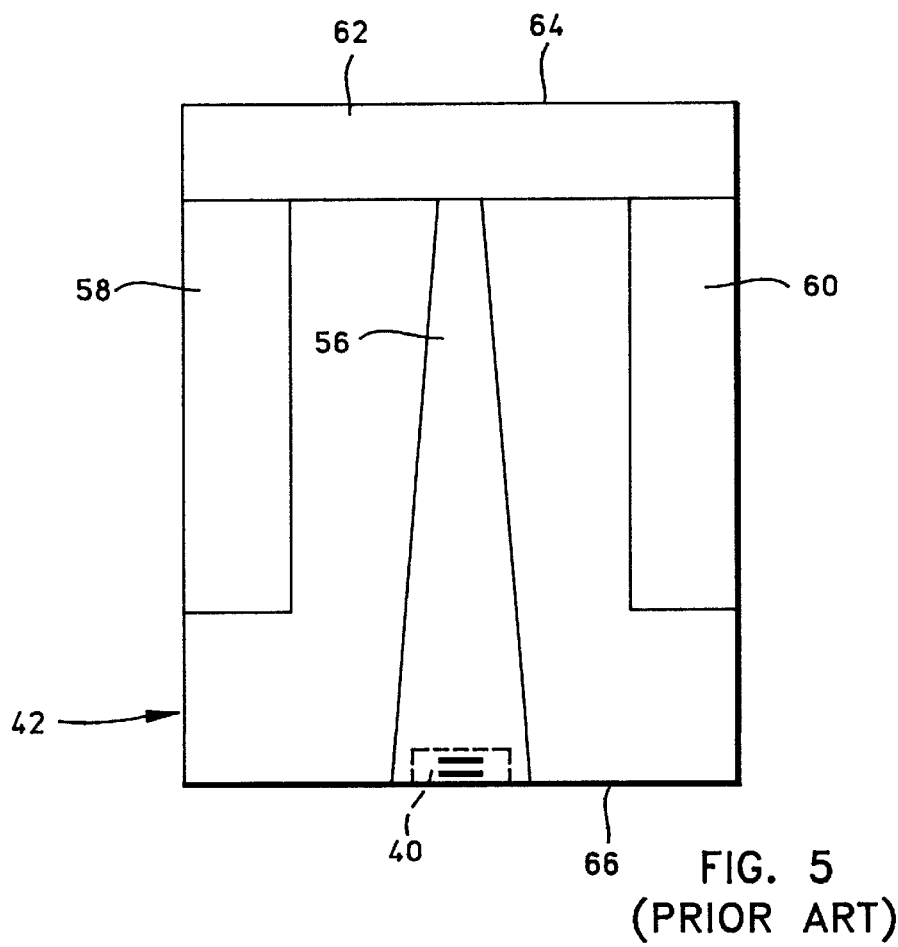
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Merged Magnetic Head

Figures 6, 7, 8:
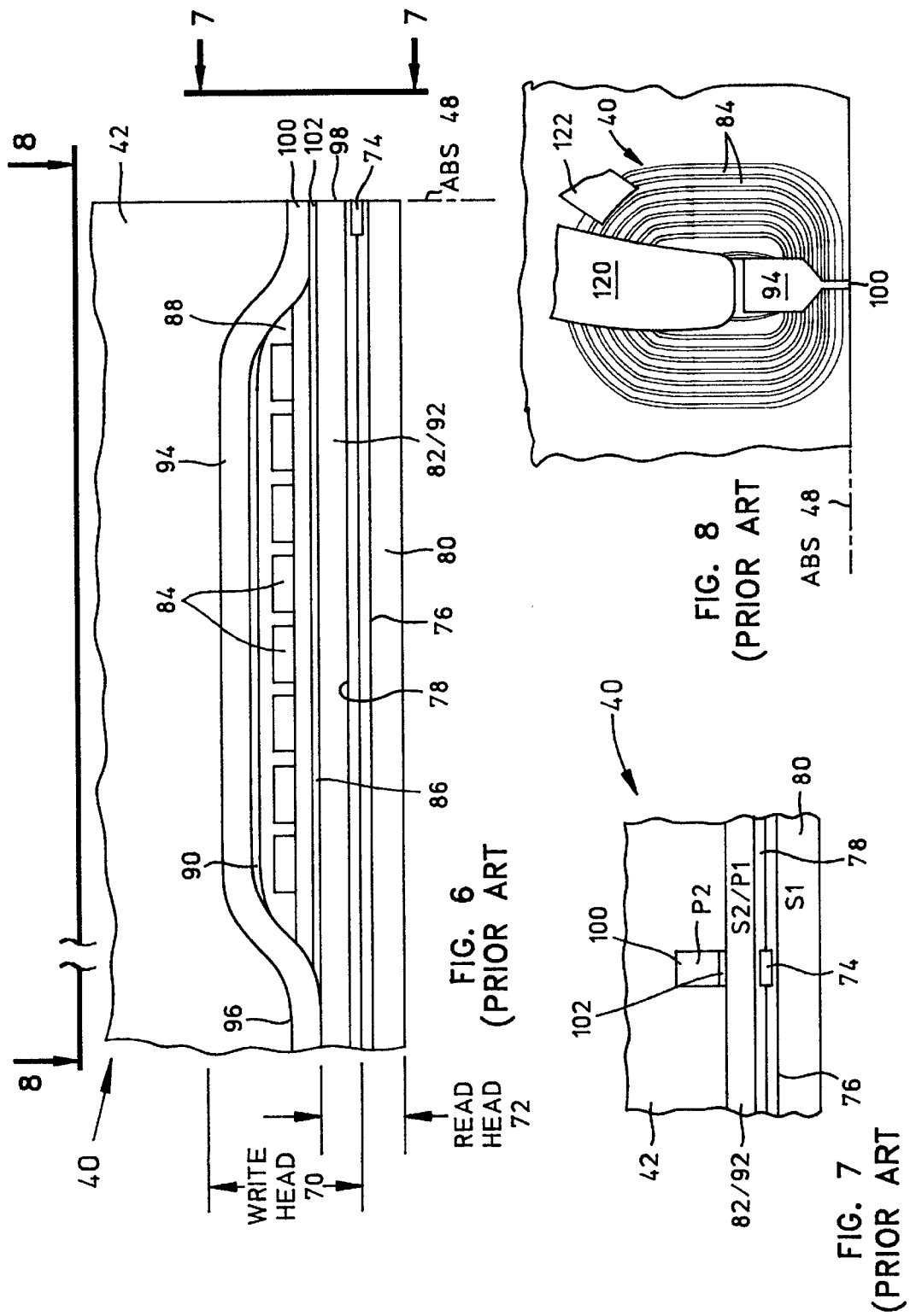
FIG. 6 is a partial view of the slider and a prior art magnetic head as seen in plane 6—6 of FIG. 2.
FIG. 7 is a partial ABS view of the slider taken along plane 7—7 of FIG. 6 to show the read and write elements of the prior art magnetic head.
FIG. 8 is a view taken along plane 8—8 of FIG. 6 with all material above the coil layer removed.

FIG. 6 is a side cross-sectional elevation view of the merged MR or spin valve head 40 which has a write head portion 70 and a read head portion 72, the read head portion employing an MR or spin valve sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. It should be noted that the merged head 50 employs a single layer 82/92 to serve a double function as a second shield layer for the read head and as a first pole piece for the write head. A piggyback head employs two separate layers for these functions.

Preferred Embodiments

Figure 9:
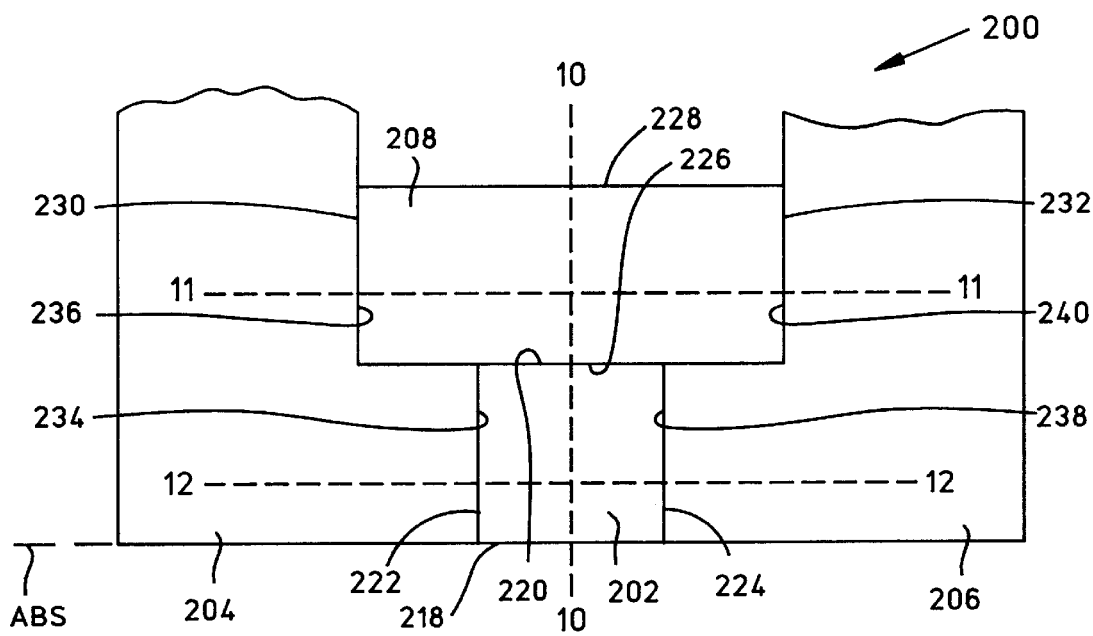
FIG. 9 is a plan view of a first embodiment of the present invention showing a read sensor, first and second leads and a flux guide.
Figure 10:
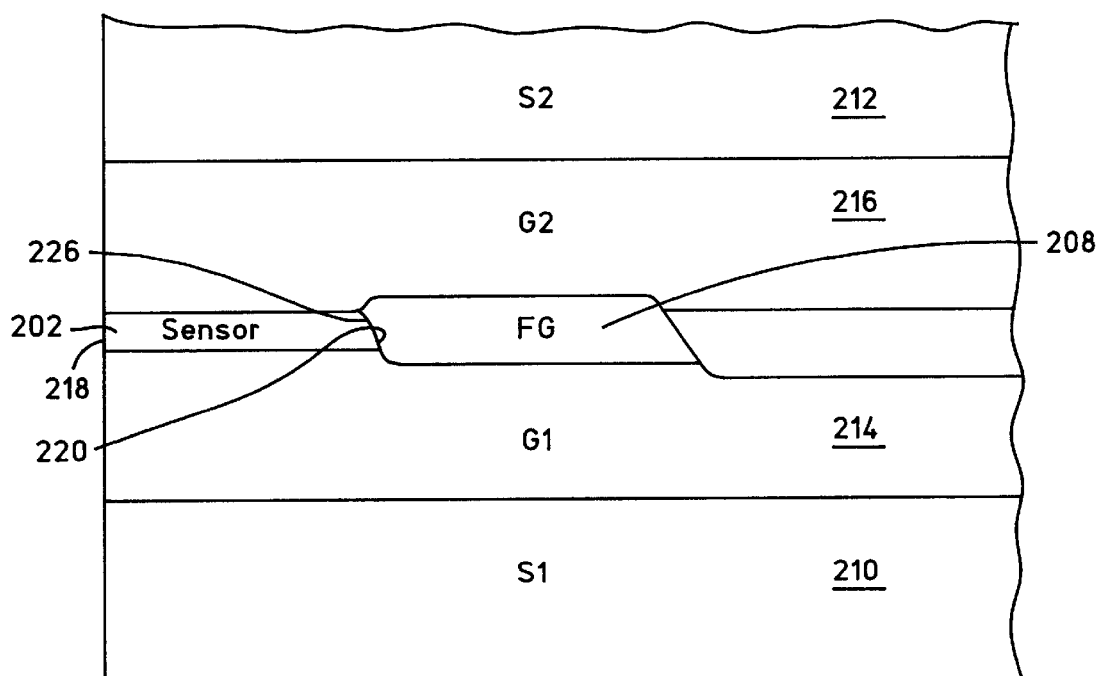
FIG. 10 is a view taken along plane 10—10 of FIG. 9.
Figure 11:
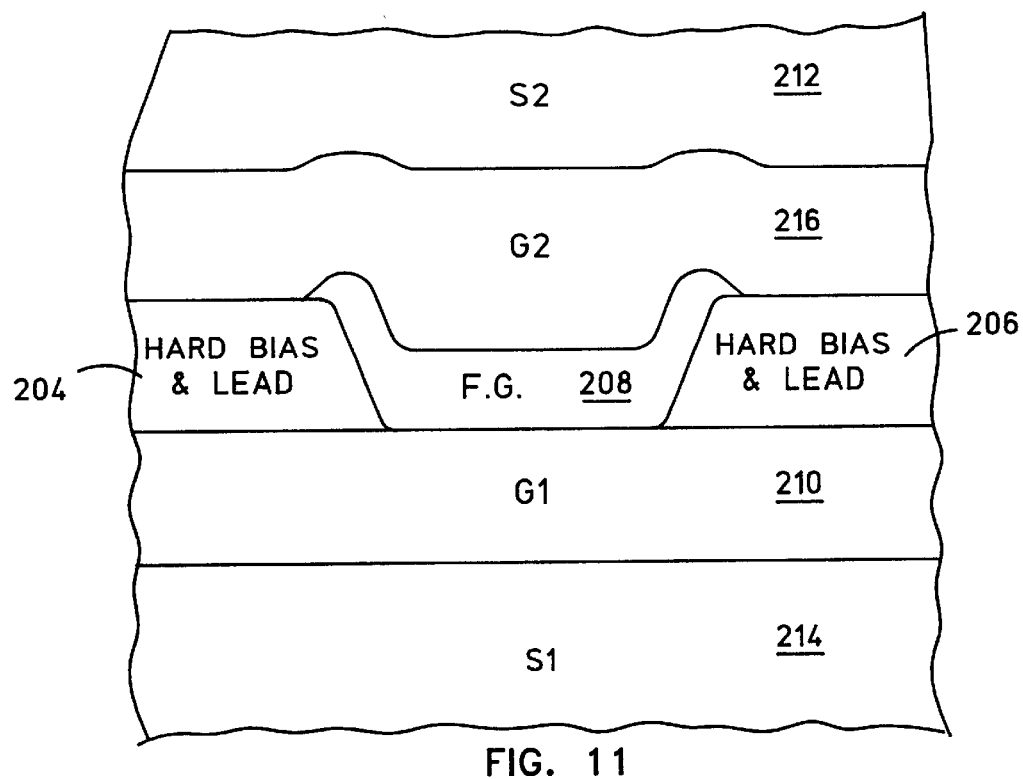
FIG. 11 is a view taken along plane 11—11 of FIG. 9.
Figure 12:
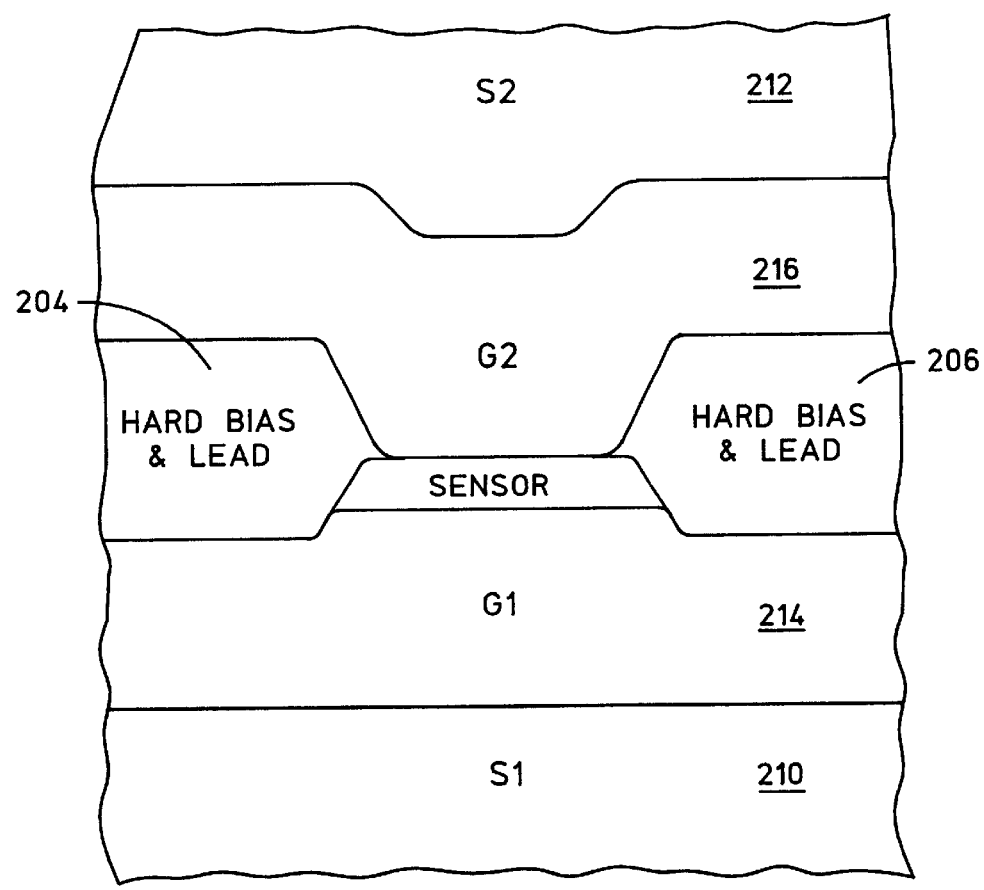
FIG. 12 is a view taken along plane 12—12 of FIG. 9.

FIGS. 9–12 illustrate a first embodiment of the present invention 200. FIG. 9 shows a schematic illustration of a read sensor 202, first and second high conductance lead layers 204 and 206 and a flux guide 208. The read sensor 202 may be either an anisotropic magnetoresistive (AMR) or a spin valve sensor as desired. In FIGS. 10–12 first and second shield layers 210 and 212 and first and second read gap layers 214 and 216 are added to the cross-sections taken in FIG. 9. As can be seen from FIGS. 10–12 the read sensor 202, the first and second leads 204 and 206 and the flux guide 208 are sandwiched between the first and second read gap layers 214 and 216 and the first and second read gap layers 214 and 216 are sandwiched between the first and second shield layers 210 and 212. As shown in FIGS. 11 and 12 the first and second leads 204 and 206 are a combination of hard bias (HB) and conductive lead material which are discrete films (not shown).

As shown in FIG. 9 the read sensor 202 has front and back edges 218 and 220 and first and second side edges 222 and 224. The flux guide layer 208 has front and back edges 226 and 228 and first and second side edges 230 and 232. The first lead layer 204 has side edges 234 and 236 and the lead layer 206 has side edges 238 and 240. As shown in FIGS. 9–12 the side edge 234 of the first lead layer abuts the first side edge 222 of the read sensor and the side edge 238 of the second lead layer abuts the second side edge 224 of the read sensor. In a similar fashion, the side edge 236 of the first lead layer abuts the first side edge 230 of the flux guide and the side edge 240 of the second lead layer abuts the second side edge 232 of the flux guide. As shown in FIGS. 9 and 10, the front edge 226 of the flux guide abuts the back edge 220 of the read sensor.

All of the aforementioned abutting connections between the read sensor 202 and the flux guide 208 and between the first and second lead layers 204 and 206 and each of the read sensor layer 202 and the flux guide layer 208 are referred to in the art as contiguous junctions. This means that the edges of the various components interfacially engage one another without any insulation material therebetween. In the prior art it has not been practical to abut the back edge 220 of the read sensor to the front edge 226 of the flux guide because prior art flux guides shunt too much current past the reach sensor 202. Accordingly, in the prior art, an insulation layer is disposed between the back edge 220 of the read sensor and the forward edge 226 of the flux guide layer so that the sense current is not shunted through the flux guide 208. This insulation, however, causes a significant decrease in magnetic conduction between the read sensor 202 and the flux guide layer 208. It should be noted that the front edge 218 of the read sensor forms a portion of the air bearing surface (ABS). It should also be noted that the width of the flux guide between first and second side edges 230 and 232 is greater than the width of the read sensor layer between its first and second side edges 222 and 224. This is due to a method of construction which will be described in detail hereinafter.

Figure 13:
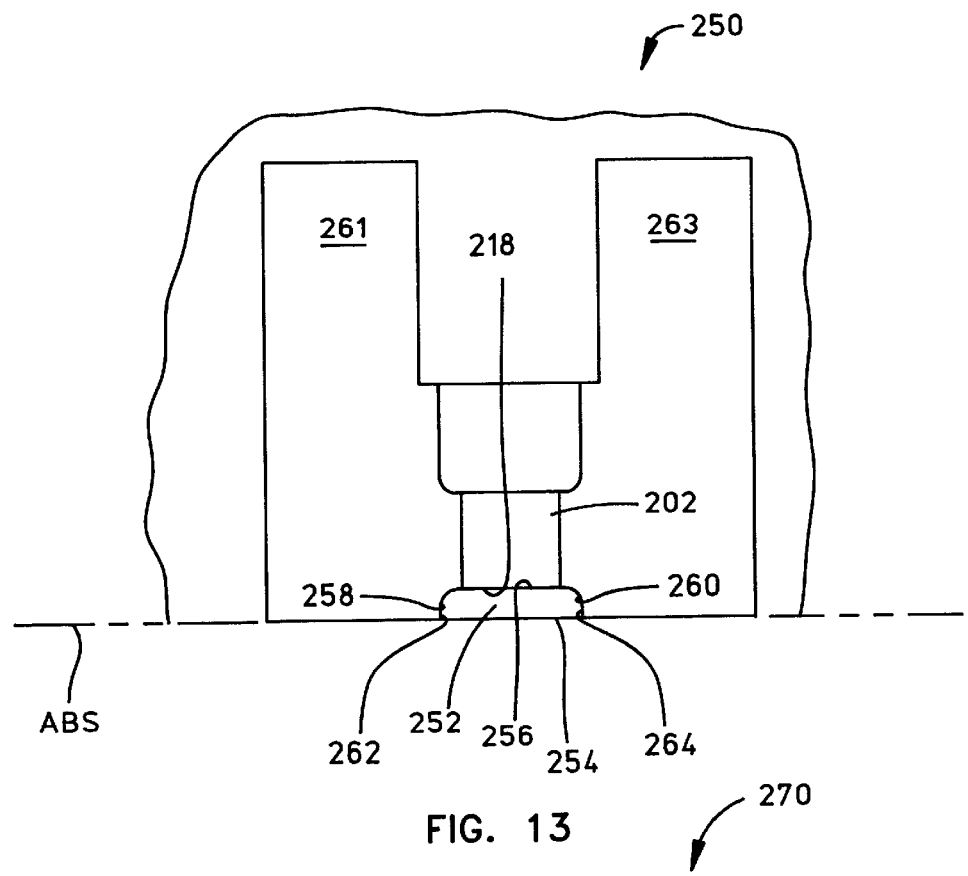
FIG. 13 is a plan view of a second embodiment of the present invention showing front and back flux guides.

FIG. 13 is an illustration of a second embodiment 250 of the present read head. This embodiment is the same as the first embodiment 200 shown in FIG. 9, except a front flux guide layer 252 is employed. The front flux guide 252 has front and back end edges 254 and 256 and first and second side edges 258 and 260. The first lead layer 261 has a side edge 262 and the second lead layer 263 has a side edge 264. The front end edge 254 of the front flux guide layer forms a portion of the ABS. The back edge 256 of the flux guide abuts the front edge 218 of the read sensor, and the side edges 262 and 264 of the lead layers abut the first and second side edges 258 and 260, respectively, of the front flux guide 252. The front flux guide 252 is employed when it is desired to protect the read sensor layer from adverse conditions originating at the ABS like corrosion, sudden temperature increases due to head disk impacts, sporadic electrical shorting to the shields due to smearing, etc.

Figure 14:
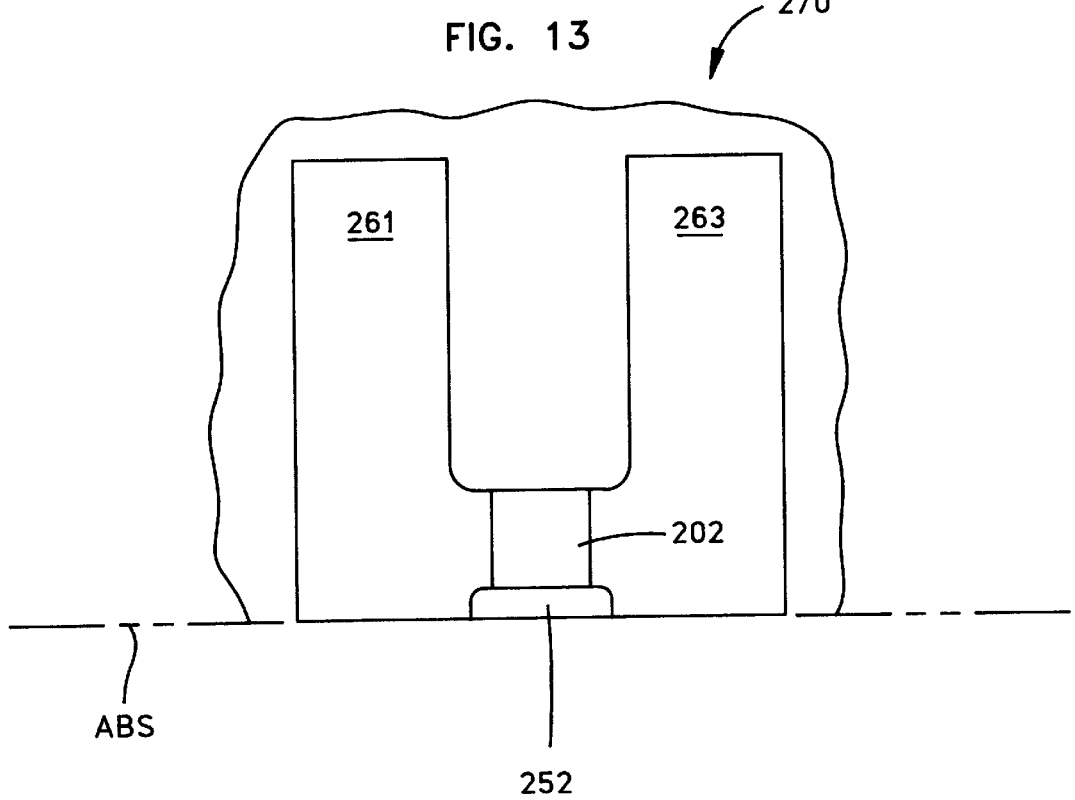
FIG. 14 is a plan view of a third embodiment of the present invention showing only a front flux guide.

Still a third embodiment 270 of the present invention is illustrated in FIG. 14 where the rear flux guide is omitted and only a front flux guide 252 is employed.

Figure 15:
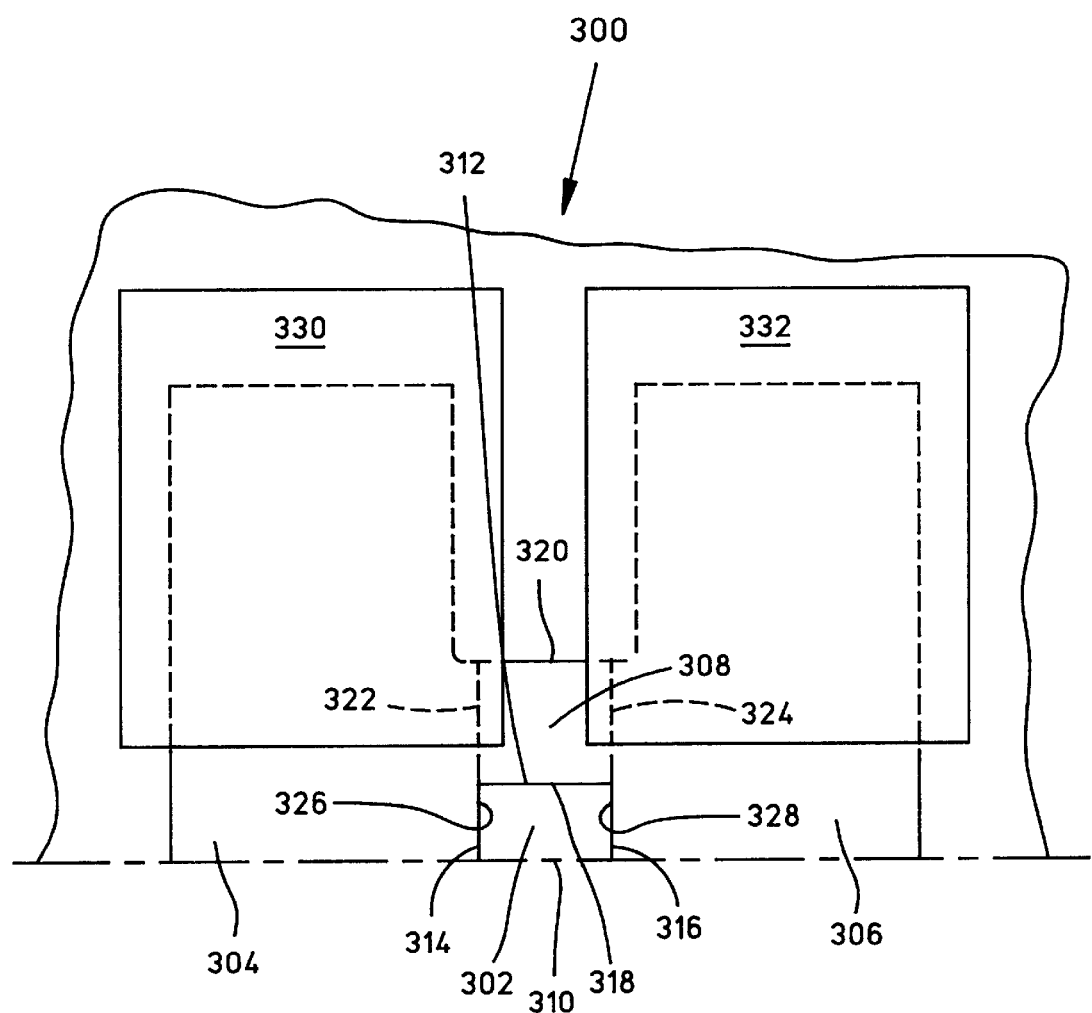
FIG. 15 is a fourth embodiment of the present invention showing only a back flux guide.

FIG. 15 illustrates a fourth embodiment 300 of the present invention. The read sensor 302 is bounded by front and rear end edges 310 and 312 and first and second side edges 314 and 316. The flux guide layer 308 is bounded by front and rear end edges 318 and 320 and first and second side edges 322 and 324. The first and second lead layers 304 and 306, which may be high resistance low corrosion material, have side edges 326 and 328, respectively. The front end edge 318 of the flux guide layer abuts the back end edge 312 of the read sensor. The side edge 326 of the first lead layer abuts the first side edges 314 and 322 of the read sensor and the flux guide layers respectively and the side edge 328 of the second lead layer abuts the second side edges 316 and 324 of the read sensor layer and the flux guide layer, respectively. Low resistance lead layers 330 and 332 may overlay the high resistance lead layers 304 and 306. The embodiment 300 in FIG. 15 differs from the embodiment 200 in FIG. 9 in that the widths of the read sensor 302 and the flux guide layer 308 are equal. This is due to a method of making which will be described in detail hereinafter.

Figure 16:
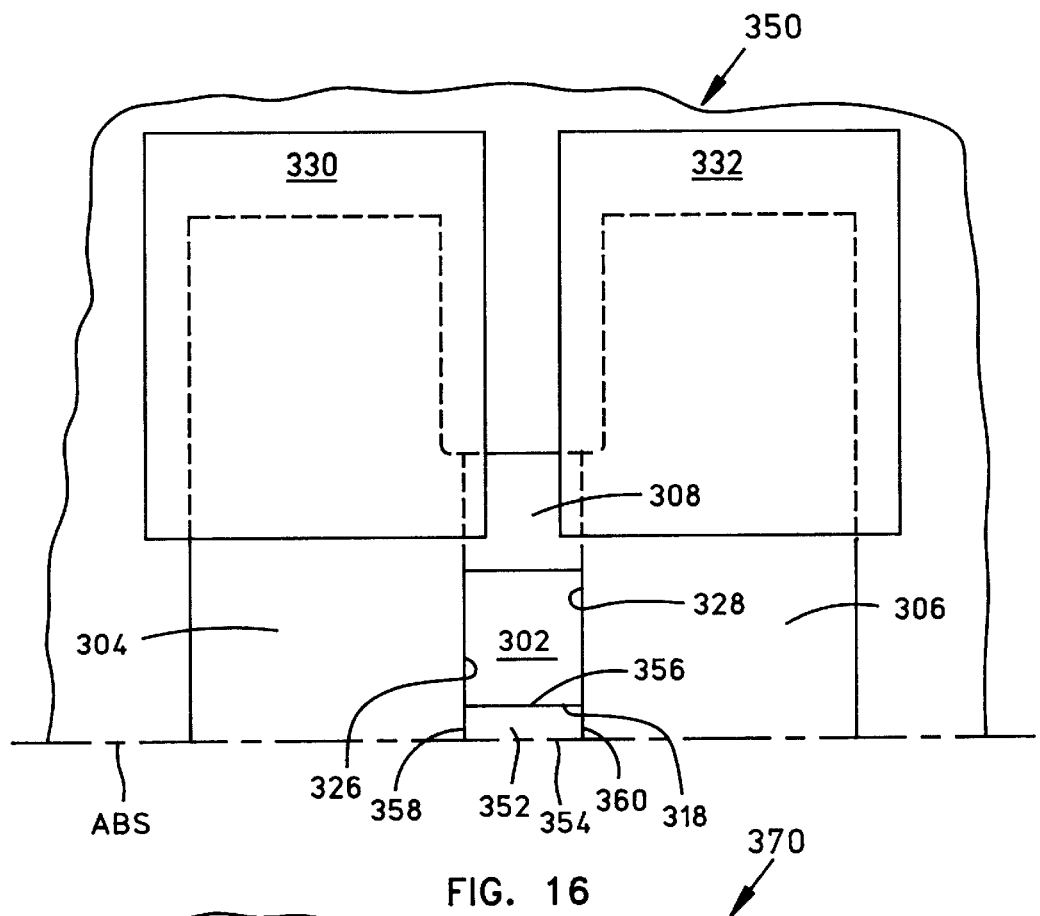
FIG. 16 is a plan view of a fifth embodiment of the present invention showing front and back flux guides.

A fifth embodiment 350 is illustrated in FIG. 16, which is the same as the embodiment 300 in FIG. 15, except a front flux guide layer 352 is employed. The front flux guide has front and back end edges 354 and 356 and first and second side edges 358 and 360. The front edge 354 of the front flux guide forms a portion of the ABS. The back edge 356 of the front flux guide abuts the front edge 318 of the read sensor, and the first and second side edges 358 and 360 of the front flux guide abut the side edges 326 and 328 of the first and second lead layers. The embodiment 350 has an advantage over the embodiment 300 in FIG. 15 in that the front flux guide 352 protects the read sensor from negative conditions at the ABS.

Figure 17:
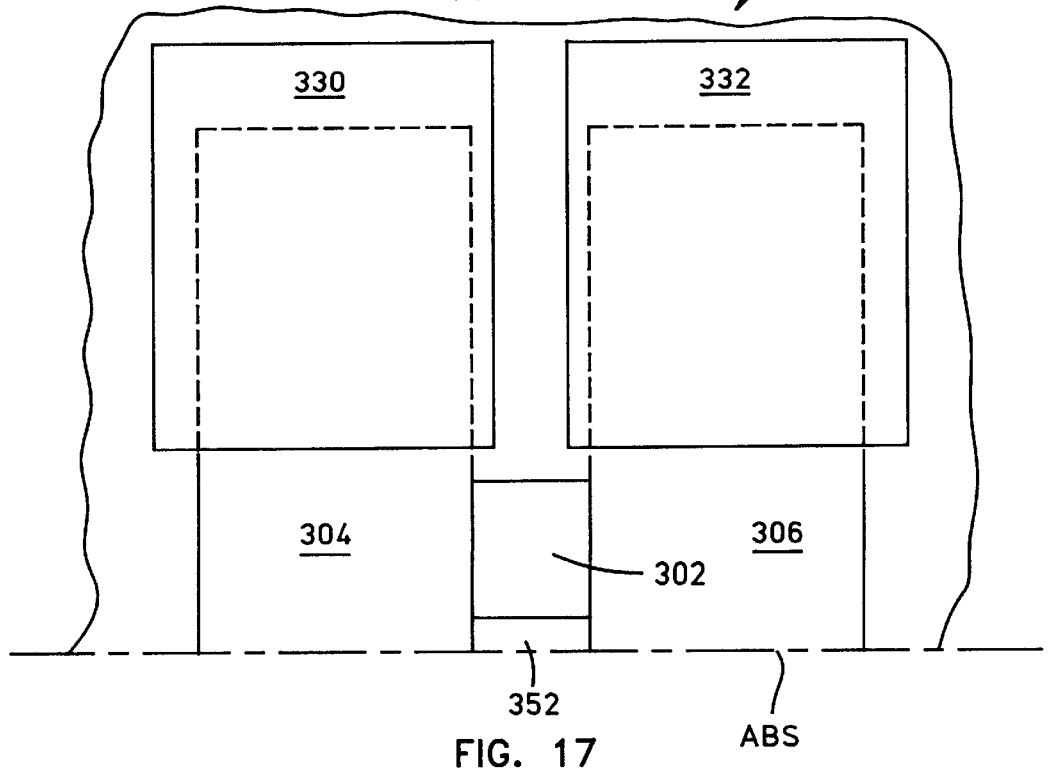
FIG. 17 is a plan view of a sixth embodiment of the present invention showing only a front flux guide.

A sixth embodiment 370 in FIG. 17 is the same as FIG. 16 except the rear flux guide 308 has been omitted. The embodiment 370 may be used where only a front flux guide 352 is employed for recessing the read sensor 302 from the ABS.

An essential requirement for high density magnetic recording is good track resolution, i.e. the ability to read narrow data tracks without interference from closely spaced neighboring tracks. This ability is closely related to the width of the sensor at the ABS (for instance the width of the edge 218 in FIG. 9). In practice, this width is the smallest lithographic feature in the entire read/write magnetic head.

In a sensor with a front flux guide, the track resolution of the sensor is essentially determined by the width of the flux guide at the ABS (for instance the width of the edge 254 in FIG. 13). Whenever a front flux guide is used, the process depicted in FIGS. 20–24 affords the narrowest width at the ABS while keeping the sensor as wide as possible. This eliminates the need for a further critical lithographic process to define the sensor. A wider sensor also translates into a larger signal.

Another embodiment would allow for a narrow front flux guide and a wide sensor. Such an embodiment is identical to what is depicted in FIGS. 9–12, except that the sensor material is replaced with flux guide material and vice versa. A rear flux guide may also be added. In the precedent embodiments the sensor is deposited as a full film, and patterned in subsequent steps. In this embodiment the sensor is deposited in the presence of a photoresist stencil.

In all embodiments the first and second lead layers comprise a longitudinal biasing film, such as a hard magnetic material or an antiferromagnetic material, for stabilizing end regions of each of the read sensor and the one or more flux guide layers. A magnetostatic coupling between the longitudinal biasing films and the end regions of each of the read sensor layer and the flux guide layers forces the magnetic domains in the end regions into a single domain state so that upon the instance of flux incursions or the absence thereof from a rotating disk the end regions remain in the single domain state as contrasted to shifting domains which cause Barkhausen noise. Accordingly, the longitudinal biasing film of each of the lead layers stabilizes the end regions of both the read sensor layer and the flux guide layers.

We have employed a special family of materials for the aforementioned flux guides so that the flux guides can abut the read sensor without significantly degrading its performance. It is important that the product of the saturation magnetism ($M_s$) and the resistivity ($\rho$) of the flux guide be as high compared to the $M_s\rho$ of the read sensor. If the read sensor is an AMR sensor this relationship is relative to a nickel iron (NiFe) stripe and if the read sensor is a spin valve sensor this relationship is relative to a nickel iron (NiFe) free layer. If the $M_s\rho$ of the NiFe layer of the read sensor is made equal to one then the $M_s\rho$ of the material of the flux guide layer should be ideally ten or more. In a preferred embodiment of the invention the $M_s\rho$ of the flux guide is greater than 50 times the $M_s\rho$ the read sensor sensing layer.

The material of the aforementioned flux guide layers is A-B-C where A is selected from the group iron (Fe) and cobalt (Co), B is selected from the group hafnium (Hf), yttrium (Y), tantalum (Ta) and zirconium (Zr) and C is selected from the group oxygen (O) and nitrogen (N). We have conducted experiments with various materials and report the results in the following chart.

| Material | $H_k$ (Oe) | $M_s$ (emu/cm$^3$) | $\mu$ | $\rho$ ($\mu\Omega$-cm) | $M_s\rho$ (rel to NiFe) | Shunting (%) |
|---|---|---|---|---|---|---|
| NiFe | 4.9 | 780 | 2000 | 25 | 1.00 | 28.6 |
| NiFeCr | 2.4 | 559 | 2927 | 47 | 1.35 | 22.9 |
| FeHfN | 5.3 | 1090 | 2584 | 185 | 10.34 | 3.7 |
| FeHfO | 5.4 | 82 | 191 | 13140 | 55.29 | 0.7 |

The first column of the chart lists the various materials that were tested, the second column lists the $H_k$ in oersteds (Oe) which is the applied field required to rotate the material layer 90° from its easy axis, the third column $M_s$ is the saturation magnetism of the material layer in electron magnetic units per cubic centimeter (emu/cm$^3$), the fourth column is permeability ($\mu$) which indicates the magnetic softness of the material, the fifth column is resistivity ($\rho$) in micro ohms centimeter ($\mu\Omega$-cm), the fifth column is the product of saturation magnetism and resistivity ($M_s\rho$) of the materials relative to nickel iron (NiFe) and the seventh column is the percentage shunting of the sense current through the various materials when the materials are employed in a flux guide in combination with a nickel (NiFe) sensing layer. The data in this column also assumes that the flux guide is of equal width and height as the sensor and it is moment matched to the NiFe sensing layer, i.e. the product of the flux guide $M_s$ times its thickness $M_s t$ is equal to the $M_s t$ product of the sensing layer.

The aforementioned special flux guide materials have a high $M_s\rho$ compared to the $M_s\rho$ of the read sensor. As shown in the chart the $_sM\rho$ of the NiFe material is normalized to 1.00 in the sixth column. The $M_s\rho$ of the remaining materials is likewise normalized so as to show their relationships to the $M_s\rho$ of NiFe. The seventh column, which shows shunting of the sense current for various materials, is an important end result. It can be seen that the $M_s\rho$ of the NiFeCr material is only a 35% improvement in $M_s\rho$ as compared to the NiFe material. Shunting has been reduced from 28.6% to 22.9%. The third material FeHfN has a $M_s\rho$ of 10.34 which is greater than 10 times the $M_s\rho$ of NiFe. It should be noted that with FeHfN the shunting of the sense current has been reduced to 3.7%. The preferred material from the special family of materials is FeHfO which has a $M_s\rho$ of 55.29 and a shunting of the sense current of only 0.7%.

Figure 18:
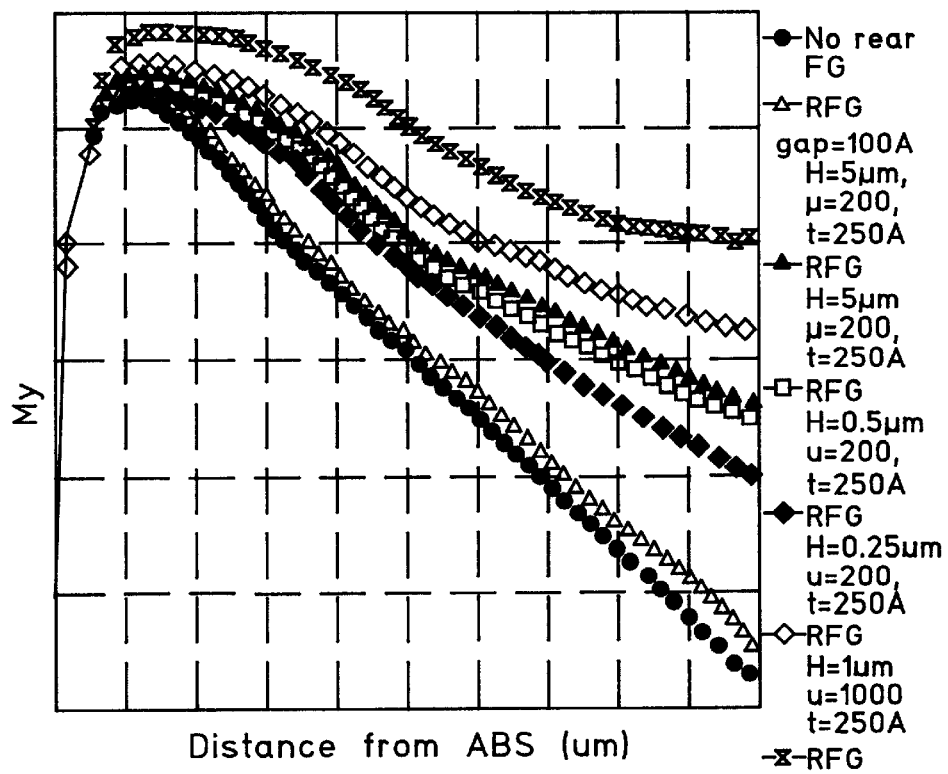
FIG. 18 is a graph showing the decay of the magnetic moment from the ABS to the back edge for various read sensors.

FIG. 18 is a graph in distance ($\mu$m) from the ABS versus the y component of the magnetic moment ($M_y$) for a NiFe read sensor film without a flux guide and with various embodiments of a flux guide. The thickness of the read sensor sensing film ($t_{sens}$)=50 Å, the thickness of the flux guide layer ($t_{fluxg}$)=250 Å, the thickness of the read gap ($g_g$)=1300 Å, the stripe height (SH), which is the distance from the ABS to the back edge of the read sensor sensing layer, is 0.5$\mu$, each of the first and second shield layers (S1 and S2) is 2$\mu$ thick by 5$\mu$ high and the applied external field ($H_{ext}$) is 1000 oersteds (Oe). The material used for the read sensor sensing layer is $Ni_{80}Fe_{20}$ and the material of the flux guide is modeled as a material with $\mu$=200, 1,000 and 2,000.

As shown in the graph, a solid circle indicates the decay of flux propagation in the read sensor from a peak near the ABS to near zero at the back edge of the read sensor (0.5 $\mu$m). The open triangles indicate the decay for a rear flux guide (RFG) with a gap of 100 Å between the flux guide and the sensor, a flux guide height of 5 $\mu$m, a permeability ($\mu$) of 200 and a thickness (t) of 250 Å. The gap of 100 Å can be implemented by a thin insulative layer such as alumina ($Al_2O_3$). It can be seen that when a gap is employed with a rear flux guide the decay from the ABS to the back edge of the read sensor is very slightly improved as compared to the previous instance in which a flux guide is omitted. The filled diamonds represent a rear flux guide with a height of 0.25 $\mu$m, a permeability ($\mu$) of 200 Å and a thickness (t) of 250 Å. It can be seen that without a gap between the rear flux guide and the read sensor the decay of the y component of the magnetic moment of the read sensor has been significantly improved. The open square represents a rear flux guide with a height (H) of 0.5 $\mu$m, a permeability $\mu$ of 200 and a thickness (t) of 250 Å. Flux propagation in the back portion of the read sensor has been further improved. The filled triangles represent a rear flux guide with a height (H) of 5 $\mu$m, a permeability ($\mu$) of 200 and a thickness (t) of 250 Å. The flux propagation in the back portion of the read sensor is still further improved. The open diamond represents a rear flux guide with a height of 1 $\mu$m, a permeability ($\mu$)=100 and a thickness (t) of 250 Å. A significant improvement in flux propagation at the back end portion of the read sensor layer was detected. The X curve represents a rear flux guide with a height of 5 $\mu$m, a permeability ($\mu$) of 2000 Å and a thickness (t) of 250 Å. It can be seen from the last example that the decay from the ABS to the back edge of the read sensor is significantly less than the first two instances where no flux guide is employed and where a flux guide is employed with a gap layer between the flux guide and the read sensor.

Figure 19:
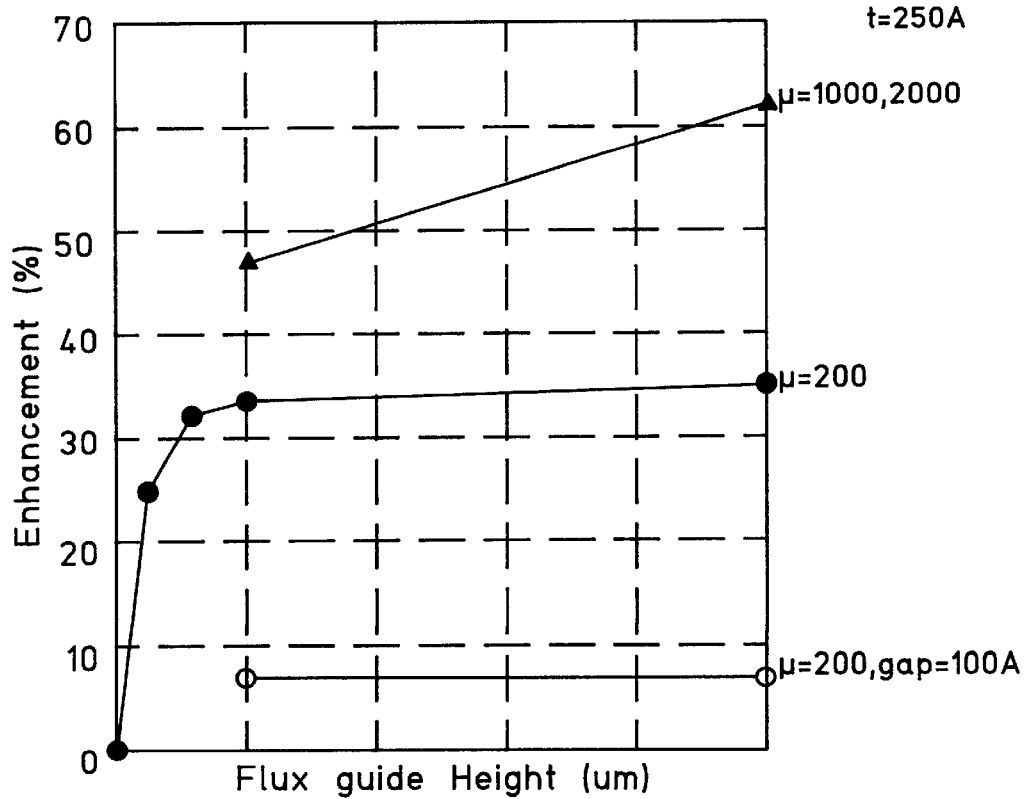
FIG. 19 is a graph showing the percentage enhancement in the magnetoresistance of various flux guides with and without a gap between the flux guide and the read sensor.
Figure 20:
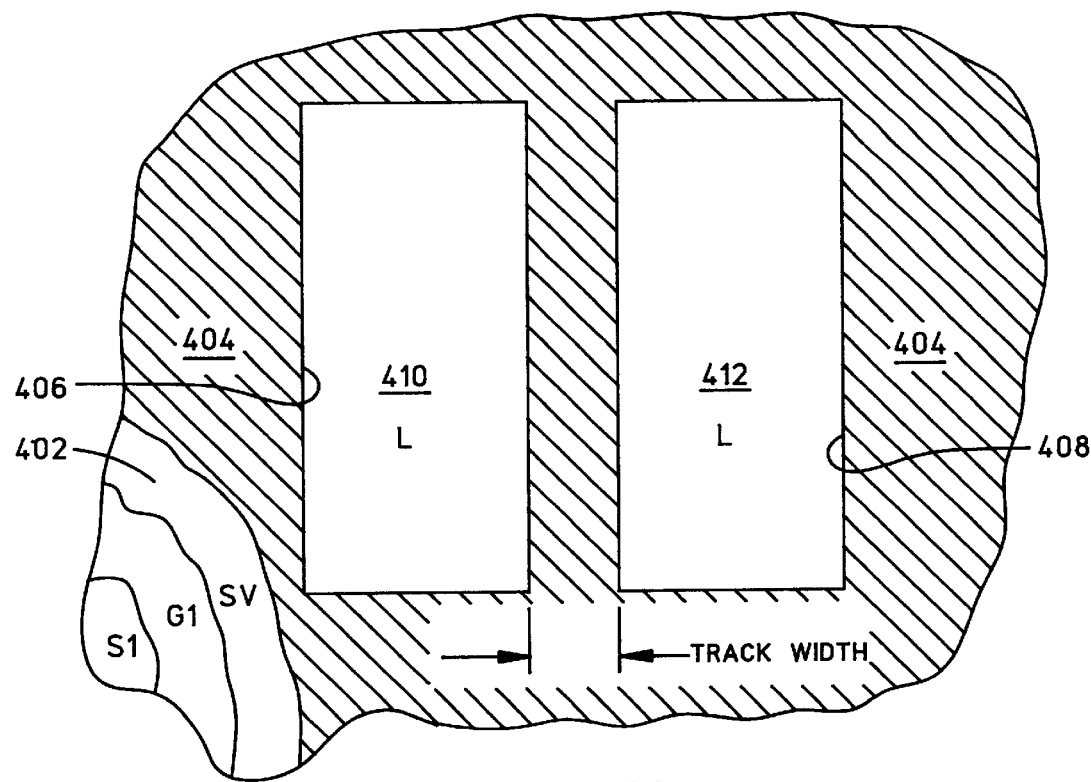
FIG. 20 is a plan view of a wafer wherein several steps have been completed with a first mask for forming first and second high resistance leads and a track width of the first embodiment of the present invention shown in FIG. 9.

FIG. 19 is a graph showing flux guide height in microns ($\mu$m) versus percentage flux enhancement of the read sensor. Flux enhancement means more magnetic rotation in the sensor and therefore a larger change in resistance (dR). One may refer to this enhancement as an increase in the magnetic efficiency of the sensor. The net signal gain provided by the flux is roughly given by the increased magnetic efficiency minus the loss due to current shunting. A high $M_sR$ flux guide is needed in order to minimize the shunting loss. If NiFe is used as a flux guide, the increase in magnetic efficiency is largely canceled by the current shunting loss. The dimensions of the various layers of the read sensor and the flux guide and the applied field in FIG. 19 is the same as described hereinabove for FIG. 18. It can be seen that when the permeability ($\mu$) of the flux guide is 200 there is no percentage enhancement in the flux guide height as it increases from 1 to 5 $\mu$m with a gap. When the permeability ($\mu$) is 200 without a gap the percentage enhancement is about 33% when the height is increased from 0 to 1 $\mu$m. When the permeability ($\mu$) is 1000 or 2000 without a gap the percentage enhancement is greater than 60% when the flux guide height is increased to 5 $\mu$m.

It can now be readily seen that the magnetic moment of the read sensor without a rear flux guide is greatest at the ABS and drops substantially to zero at its back edge. Therefore, a read sensor without a flux guide is utilizing only about 50% of its full potential as a magnetoresistive (MR) sensor. Theoretically, if decay could be avoided the efficiency of the MR sensor would be doubled. When a gap is employed between the flux guide and the read sensor the flux guide enhancement is substantially zero. With the present invention the flux propagation within the read sensor at its back edge can be increased more than 50%. In many instances the flux guide is designed to have the same magnetic equivalent as the free layer of a spin valve or the MR stripe of an AMR sensor. Assuming a flux guide with the same width and height of the sensing layer of the read sensor the thickness (t) can be designed to provide the flux guide with a magnetic equivalent to that of the sensing layer of the read sensor. With a FeHfO flux guide shown in the above chart, only 0.7% of the sense current is shunted by the flux guide.

Method of Making

A first method of making is shown in FIGS. 20–24 and a second method of making is shown in FIGS. 25–29 wherein masks are highlighted by cross-sectioning. The method of making is performed on a suitable substrate for recording heads fabrication, typically a ceramic formed with $Al_2O_3$ and TiC. The substrate is coated with a layer of insulating material, like $Al_2O_3$, and lapped flat. A first magnetic shield layer (S1) and a first insulating read gap layer (G1) are deposited.

Figure 25:
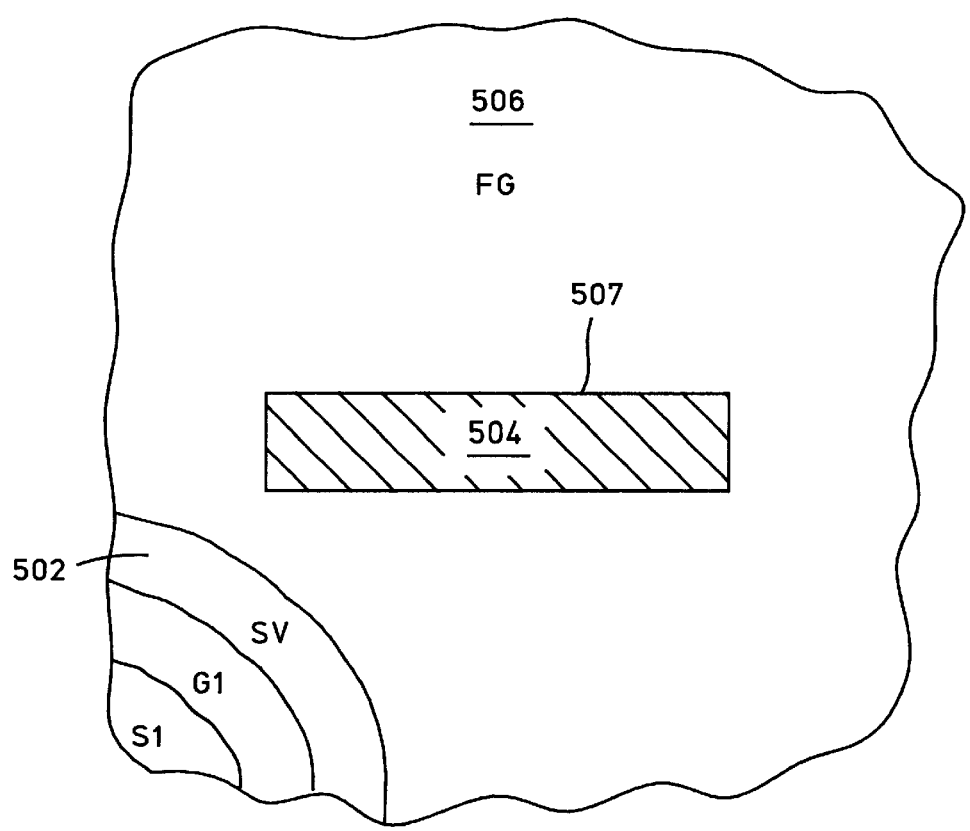
FIG. 25 is a plan view of a portion of a wafer where a first mask has been formed to protect a read sensor site.

FIG. 25 shows first steps in the construction of the read head. After deposition of a read sensor film 402, such as a spin valve (SV) sensor film, a first photoresist mask 404, suitable for lift-off, (typically a bi-layer resist where after development the top resist layer overhangs the bottom layer) is patterned to cover the sensor film except openings 406 and 408 designated for conducting leads. Ion milling is first performed to clear the sensor film in the openings. Without removing the mask 404, a lead structure 410 and 412 is then deposited by either conventional sputtering or ion beam sputter deposition.

The lead structure will consist primarily of a permanent magnet film of appropriate thickness to provide longitudinal stabilization to the sensor film and a highly conductive film to carry current to the sensor with minimal parasitic resistance. The mask 404 is removed and the lead film thereon lifted off This process leaves a so-called butted or contiguous junction at the boundary between the sensor film 402 and the lead film 410 and 412.

Figure 21:
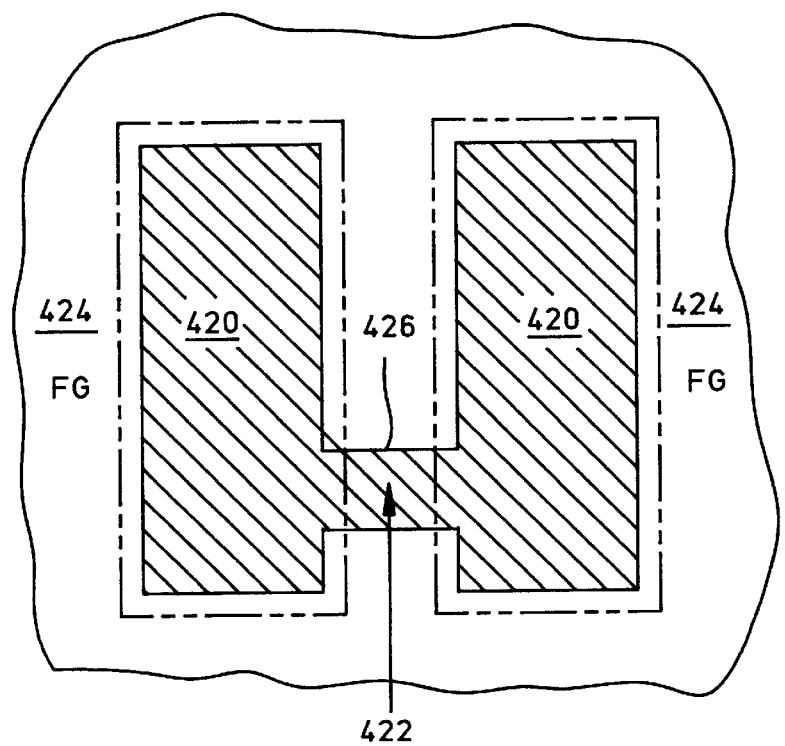
FIG. 21 is the same as FIG. 20 except a second mask has been formed for defining the back edge of the read sensor.

As shown in FIG. 21 a photoresist mask 420 suitable for lift-off is patterned to cover most of the lead material and a strip 422 of sensor material. Ion milling is performed to clear the sensor material in the exposed areas. Without removing the photoresist mask 420 a flux guide material 424 is deposited, by either conventional sputtering or ion beam sputtering. The resist mask 420 is then removed and the flux guide lifted off.

This process leaves a butted junction at the boundary 426 between the sensor film 422 and flux guide film 424. This intimate contact at the boundary is crucial to the efficiency of the flux guide. This process also leaves a butted junction at the boundary between the flux guide material and the aforementioned permanent magnet (not shown) and lead structure (410 and 412), thus providing longitudinal stabilization to the flux guide material 424.

Figure 22:
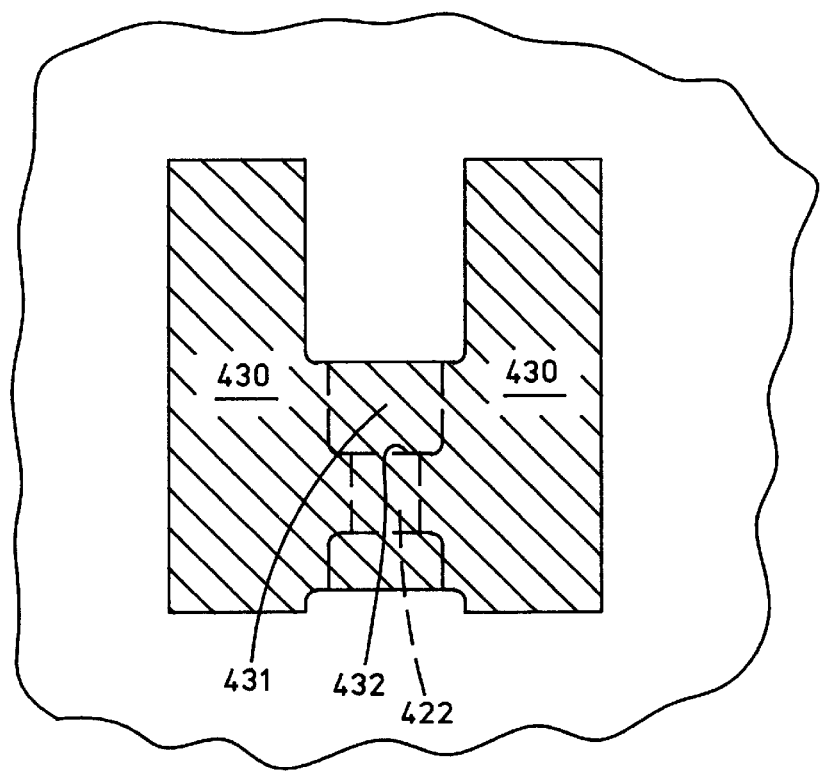
FIG. 22 is the same as FIG. 21 except a third mask has been employed for defining front and back edges of front and back flux guides, respectively.

As shown in FIG. 22, a photoresist mask 430 suitable for lift-off is patterned to cover most of the remaining lead material and sensor material, and a given amount of flux guide material on each side of the sensor area 422. Ion milling is performed to clear the flux guide material in the exposed areas. Without removing the photoresist mask 430 an insulating material is optionally deposited to heal any damage incurred in the first gap following the ion milling steps. The resist mask 430 is removed and the insulating film thereon lifted off. At the end of this process the sensor is left with a flux guide 431 of given height and abutting the back edge 432 of the sensor. This height is designed to optimize the signal, by balancing magnetic efficiency and current shunting.

Figure 23:
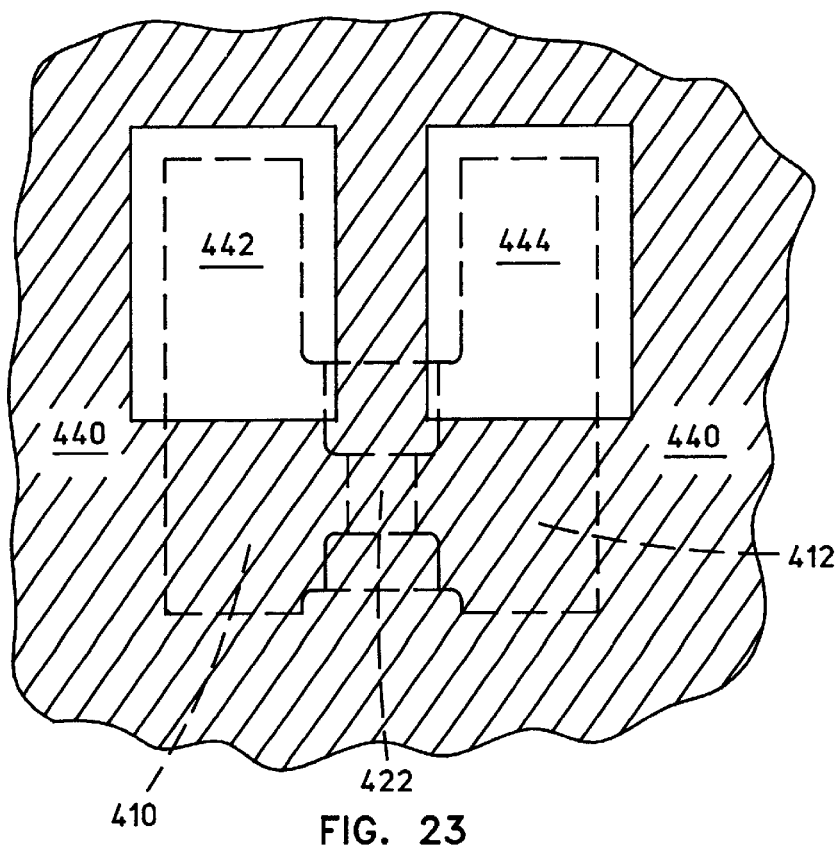
FIG. 23 is the same as FIG. 22 except a fourth mask has been employed for forming first and second low resistance leads which overlap the first and second high resistance leads.

As shown in FIG. 23 a lift-off mask 440 may be optionally used to deposit a second lead structure 442 and 444 on top of the first structure 410 and 412 in order to lower the parasitic resistance. This lead structure contains a good conductivity material like Cu or Au, a seed or adhesion layer like Ta may be at the bottom and a capping layer on top.

Figure 24:
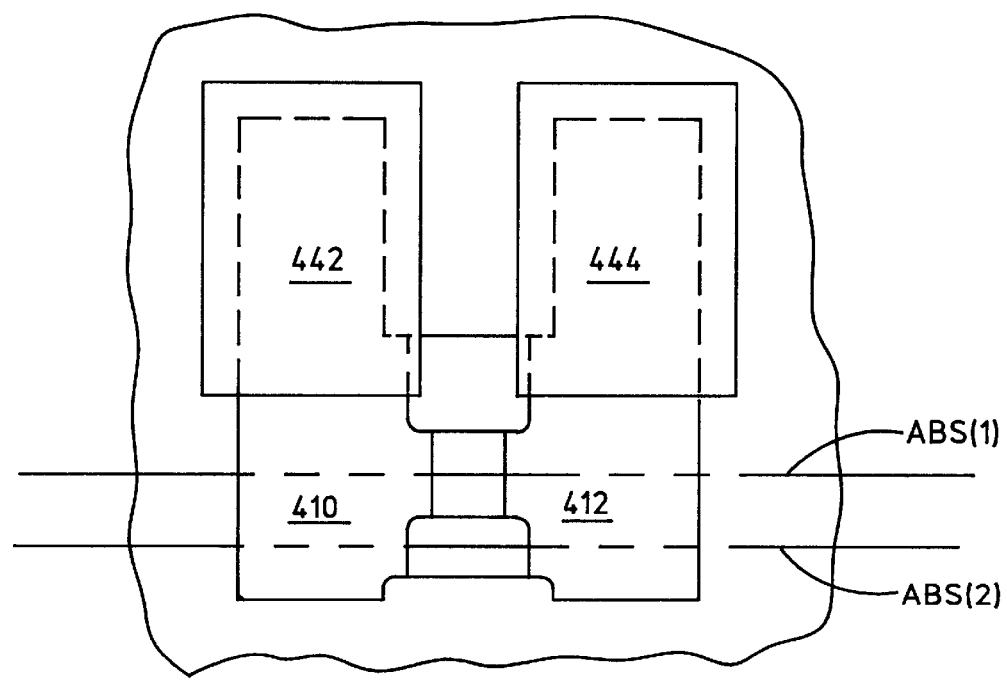
FIG. 24 is the same as FIG. 23 except the fourth mask has been removed.

FIG. 24 shows the partially completed read head after removal of the mask 440. The front of the sensor is defined by mechanical dicing and lapping procedures to define the air bearing surface ABS(1). Depending on the relative position of the ABS and the masking steps described above the sensor may or may not have flux guide material at the ABS. If a front flux guide is desired lapping is performed to ABS(2). A front flux guide may be employed to recess the sensor. For magnetic efficiency reasons the front flux guide height should be minimized. It is also obvious that, if so desired, one may arrange the masks to have only a flux guide in the front and no flux guide in the rear. It must be noted that the sensor's magnetic track width is determined by the width of the front flux guide, which in this process sequence, is larger than the sensor track width. This makes narrow track widths difficult to achieve. An alternative process better suited for narrow track width applications will be described next.

FIGS. 25–29 illustrate another method of making. In FIG. 25 a sensor film (SV) 502 is deposited on the first gap (G1). A photoresist mask 504, suitable for lift-off, covers a strip of sensor material. Ion milling is performed to clear the sensor material in the exposed areas. Without removing the photoresist mask 504 flux guide material 506 is deposited by either conventional sputtering or ion beam sputtering. The resist mask 504 is then removed and the flux guide material thereon lifted off. This process leaves a butted junction at the boundary 507 between the sensor film under mask 504 and the flux guide film 506.

Figure 26:
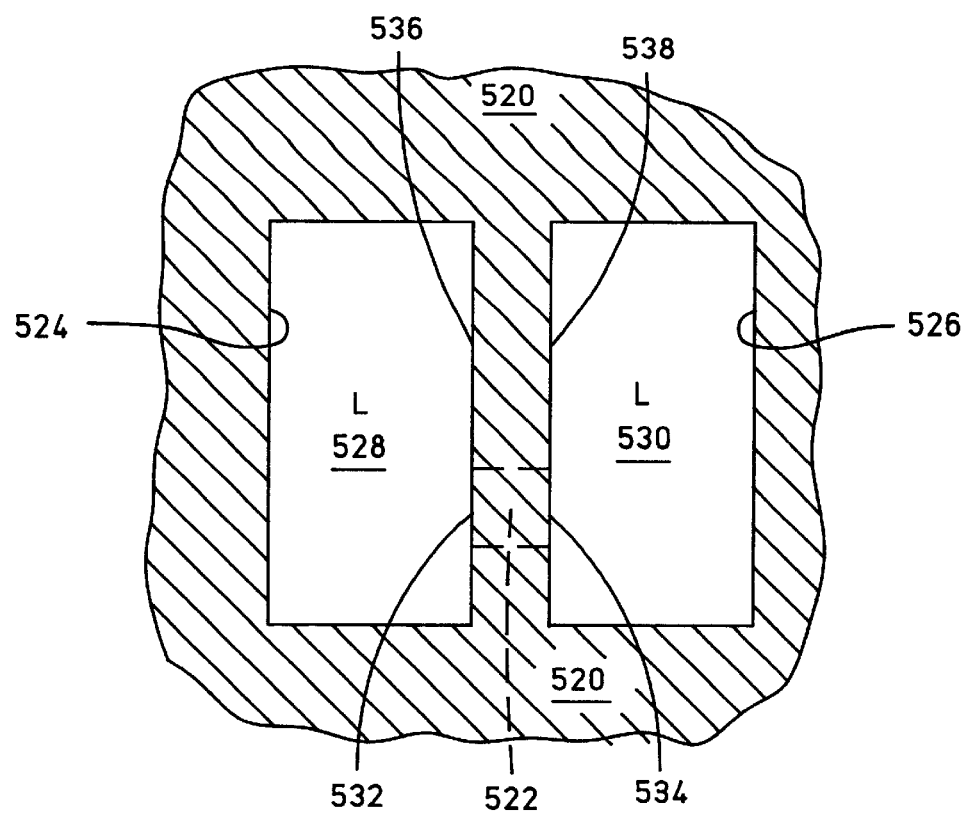
FIG. 26 is the same as FIG. 25 except the first mask has been removed and a second mask has been formed for forming first and second high resistance leads and defining the track width of the read sensor and the flux guide.

In FIG. 26 a photoresist mask 520 suitable for lift-off is patterned to cover the sensor film 522 and the flux guide film except in openings 524 and 526 designated for conducting leads. Ion milling is first performed to clear the sensor and the flux guide materials in the openings 524 and 526. Without removing the resist mask 520, a lead structure 528 and 530 is then deposited by either conventional sputtering or ion beam sputter deposition. This lead structure 528 and 530 consists primarily of a permanent magnet film (not shown) and a highly conductive film (not shown) to carry current to the sensor with minimal parasitic resistance. Additional ancillary layers for structure control, adhesion or capping may be required. This resist mask 520 is then removed and the lead film thereon lifted off. This process leaves butted junctions at the boundaries 532 and 534 between the sensor film 522 and the lead film 528 and 530, and butted junctions at the boundaries 536 and 538 between the flux guide film and the lead film, thus providing longitudinal stabilization to both films. It should also be noted that the flux guide and the sensor track width are now essentially identical since they are defined by the same mask.

Figure 27:
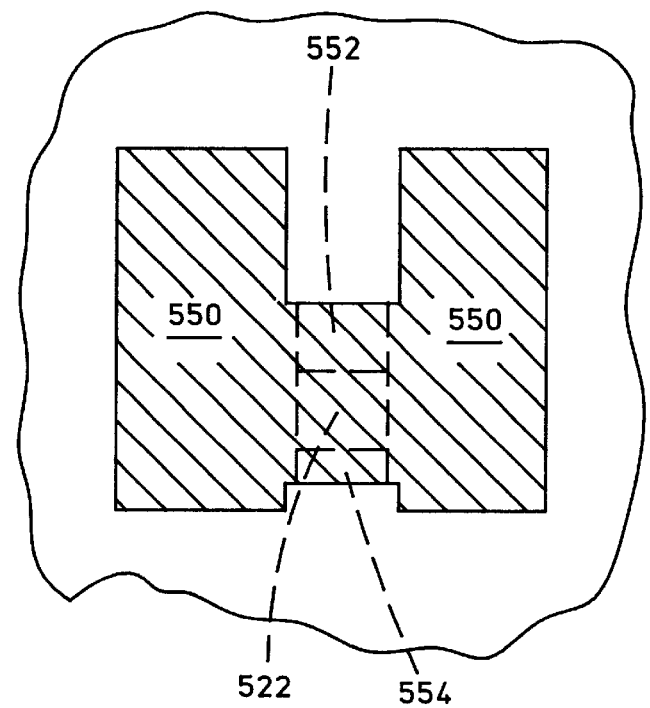
FIG. 27 is the same as FIG. 26 except a third mask has been employed for defining front and back edges of front and back flux guides, respectively.

As shown in FIG. 27 a photoresist mask 550 suitable for lift-off is patterned to cover most of the lead material and sensor material, and a given amount of flux guide material 552 and 554 on each end of the sensor area 522. Ion milling is performed to clear the flux guide material in the exposed areas. Without removing the photoresist mask 550 an insulating material is optionally deposited to heal any damage incurred in the first gap following ion milling. The resist mask 550 is then removed and the insulating film thereon lifted off. These steps define the height of the flux guides in the front or the rear of the sensor 522.

Figure 28:
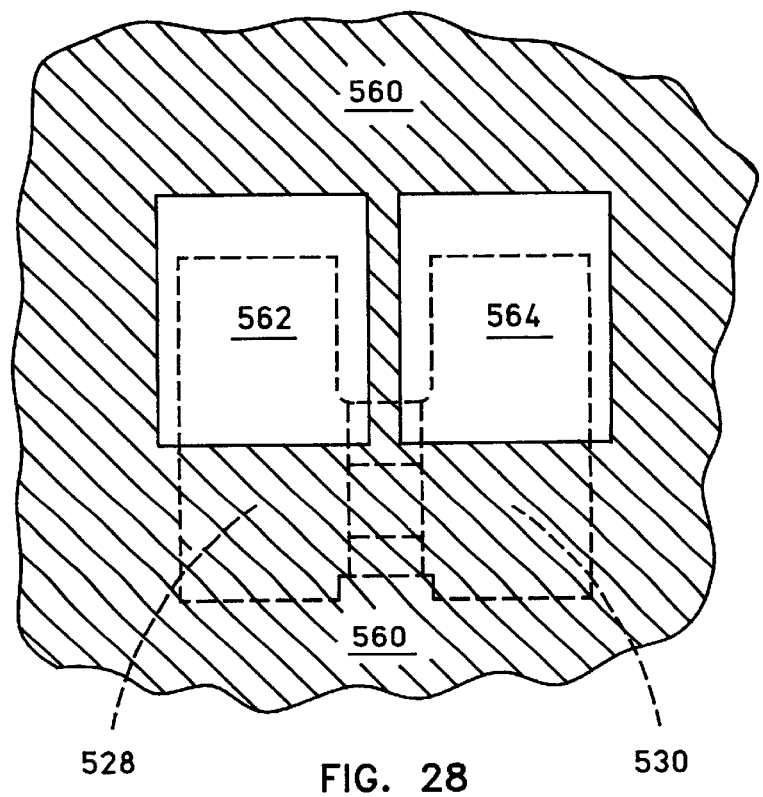
FIG. 28 is the same as FIG. 27 except a fourth mask has been employed for forming first and second low resistance leads that overlap the first and second high resistance leads.
Figure 29:
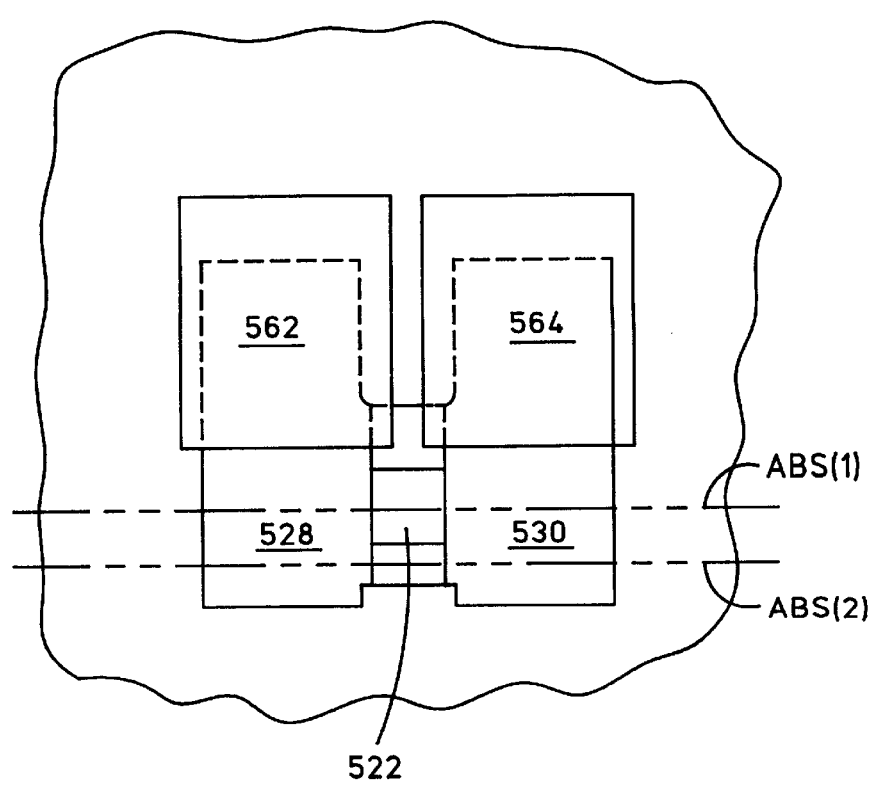
FIG. 29 is the same as FIG. 28 except the fourth mask has been removed.

As shown in FIG. 28 a lift-off mask 560 may be optionally used to deposit a second lead structure 562 and 564 on top of the first structure in order to lower the parasitic resistance. As shown in FIG. 29 the mask 560 has been removed. After depositing a second gap layer, a second shield layer and completing the write head the head may be lapped at ABS(1) or ABS(2) as discussed hereinabove.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head that has a front air bearing surface (ABS) comprising:

a read sensor layer that is bounded by front and back edges and first and second side edges;

a first flux guide layer bounded by front and rear edges and first and second side edges;

one of the front and rear edges of the first flux guide layer abutting one of the front and rear edges of the read sensor layer;

first and second lead layers wherein each lead layer has a respective side edge;

the side edge of the first lead layer abutting the first side edge of each of the read sensor layer and the first side edge of the first flux guide layer and the side edge of the second lead layer abutting the second side edge of the read sensor layer and the second side edge of the first flux guide layer;

the first flux guide layer being A-B-C where A is selected from the group Fe and Co, B is selected from the group Hf, Y, Ta and Zr and C is selected from the group O and N;

first and second gap layers;

the read sensor layer, the first flux guide layer and the first and second lead layers being sandwiched between the first and second gap layers;

first and second shield layers; and the first and second gap layers being sandwiched between the first and second shield layers.

2. A magnetic head as claimed in claim 1 wherein the read sensor layer includes:

a ferromagnetic free film, a ferromagnetic pinned film and a nonmagnetic electrically conductive spacer film that is sandwiched between the free and pinned films; and an antiferromagnetic pinning film immediately adjacent the pinned film.

3. A magnetic head as claimed in claim 2 including:

each of the first and second lead layers having a hard bias film; and the hard bias films of the first and second lead layers longitudinally biasing the read sensor layer and the first flux guide layer parallel to the ABS.

4. A magnetic head as claimed in claim 3 wherein the free film is Ni—Fe.

5. A magnetic head as claimed in claim 4 where A-B-C is Fe—Hf—N.

6. A magnetic head as claimed in claim 4 where A-B-C is Fe—Hf—O.

7. A magnetic head as claimed in claim 6 including:

first and second pole piece layers wherein the first pole piece layer is a common layer with said second shield layer;

a gap layer;

the first and second pole piece layers being separated by the gap layer at the ABS and connected together at a back gap;

an insulation stack with at least one coil layer embedded therein; and the insulation stack being sandwiched between the first and second pole piece layers and being located between the ABS and said back gap.

8. A magnetic head as claimed in claim 1 including:

each of the first and second lead layers having a hard bias film; and the hard bias films of the first and second lead layers longitudinally biasing the read sensor layer and the first flux guide layer parallel to the ABS.

9. A magnetic head as claimed in claim 8 wherein the first side edges of the read sensor layer and the first flux guide layer are coextensive and the second side edges of the read sensor layer and the first flux guide layer are coextensive.

10. A magnetic head as claimed in claim 9 where A-B-C is Fe—Hf—O.

11. A magnetic head as claimed in claim 10 including:

first and second pole piece layers wherein the first pole piece layer is a common layer with said second shield layer;

a gap layer;

the first and second pole piece layers being separated by the gap layer at the ABS and connected together at a back gap;

an insulation stack with at least one coil layer embedded therein; and the insulation stack being sandwiched between the first and second pole piece layers and being located between the ABS and said back gap.

12. A magnetic head that has a front air bearing surface (ABS) comprising:

a read sensor layer that is bounded by front and back edges and first and second side edges;

a first flux guide layer bounded by front and rear edges and first and second side edges;

one of the front and rear edges of the first flux guide layer abutting one of the front and rear edges of the read sensor layer;

first and second lead layers wherein each lead layer has a respective side edge;

the side edge of the first lead layer abutting the first side edge of each of the read sensor layer and the first side edge of the first flux guide layer and the side edge of the second lead layer abutting the second side edge of the read sensor layer and the second side edge of the first flux guide layer;

a second flux guide layer bounded by first and second side edges;

the side edge of the first lead layer abutting the first side edge of the second flux guide layer and the side edge of the second lead layer abutting the second side edge of the second flux guide layer;

the front edge of the second flux guide layer abutting the back edge of the read sensor layer and the back edge of the first flux guide layer abutting the front edge of the read sensor layer; and the front edge of the first flux guide layer forming a portion of said ABS;

each of the first and second flux guide layers being A-B-C where A is selected from the group Fe and Co, B is selected from the group Hf, Y, Ta and Zr and C is selected from the group O and N;

first and second gap layers;

the read sensor layer, the first flux guide layer and the first and second lead layers being sandwiched between the first and second gap layers;

first and second shield layers; and the first and second gap layers being sandwiched between the first and second shield layers.

13. A magnetic head as claimed in claim 12 wherein the read sensor layer includes:

a ferromagnetic free film, a ferromagnetic pinned film and a nonmagnetic electrically conductive spacer film that is sandwiched between the free and pinned films;

an antiferromagnetic pinning film immediately adjacent the pinned film; and the free film being Ni—Fe.

14. A magnetic head as claimed in claim 13 where A-B-C is Fe—Hf—O.

15. A magnetic head as claimed in claim 14 including:

first and second pole piece layers wherein the first pole piece layer is a common layer with said second shield layer;

a gap layer;

the first and second pole piece layers being separated by the gap layer at the ABS and connected together at a back gap;

an insulation stack with at least one coil layer embedded therein; and the insulation stack being sandwiched between the first and second pole piece layers and being located between the ABS and said back gap.

16. A magnetic disk drive that includes at least one merged magnetic head that has an air bearing surface (ABS), the disk drive comprising:

the merged magnetic head having a read head portion that includes:
- a read sensor layer that is bounded by front and back edges and first and second side edges;
- at least one flux guide layer bounded by front and rear edges and first and second side edges;
- said at least one flux guide layer being A-B-C where A is selected from the group Fe and Co, B is selected from the group Hf, Y, Ta and Zr and C is selected from the group O and N;
- one of the front and rear edges of the at least one flux guide layer abutting one of the front and rear edges of the read sensor layer;
- first and second lead layers wherein each lead layer has a respective side edge;
- the side edge of the first lead layer abutting the first side edge of each of the read sensor layer and the first side edge of the at least one flux guide layer and the side edge of the second lead layer abutting the second side edge of the read sensor layer and the second side edge of the at least one flux guide layer;
- first and second gap layers;
- the read sensor layer, the at least one flux guide layer and the first and second lead layers being sandwiched between the first and second gap layers; first and second shield layers; and
- the first and second gap layers being sandwiched between the first and second gap layers;

the merged magnetic head having a write head portion that includes:
- first and second pole piece layers wherein the first pole piece layer is a common layer with said second shield layer;
- a gap layer;
- the first and second pole piece layers being separated by the gap layer at the ABS and connected together at a back gap;
- an insulation stack with at least one coil layer embedded therein; and
- the insulation stack being sandwiched between the first and second pole piece layers and being located between the ABS and said back gap;

a housing;

a magnetic disk rotatably supported in the housing;

a support mounted in the housing for supporting the merged magnetic head in a transducing relationship with the magnetic disk;

means for rotating the magnetic disk;

positioning means connected to the support for moving the merged magnetic head to multiple positions with respect to said magnetic disk; and means connected to the merged magnetic head, to the means for rotating the magnetic disk and to the positioning means for exchanging signals with the merged magnetic head, for controlling movement of the magnetic disk and for controlling the position of the merged magnetic head.

17. A disk drive as claimed in claim 16 wherein the read sensor layer includes:
- a ferromagnetic free film, a ferromagnetic pinned film and a nonmagnetic electrically conductive spacer film that is sandwiched between the free and pinned films;
- an antiferromagnetic pinning film immediately adjacent the pinned film; and
- the free film being Ni—Fe.

18. A disk drive as claimed in claim 17 including:
- each of the first and second lead layers having a hard bias film; and
- the hard bias films of the first and second lead layers longitudinally biasing the read sensor layer and the at least one flux guide layer parallel to the ABS.

19. A disk drive as claimed in claim 18 where A-B-C is Fe—Hf—O.

* * * * *